(12) United States Patent
Schutz et al.

(10) Patent No.: US 7,577,659 B2
(45) Date of Patent: Aug. 18, 2009

(54) INTEROPERABLE CREDENTIAL GATHERING AND ACCESS MODULARITY

(75) Inventors: Klaus U. Schutz, Kirkland, WA (US); Stefan Richards, Sammamish, WA (US); Eric C. Perlin, Redmond, WA (US); Cristian Ilac, Sammamish, WA (US); Sterling M. Reasor, Bellevue, WA (US); Eric Flo, Sammamish, WA (US); John Stephens, Sammamish, WA (US); Benjamin A. Hutz, Providence, RI (US)

(73) Assignee: Microsoft Corporation, Redmond, WA (US)

( * ) Notice: Subject to any disclaimer, the term of this patent is extended or adjusted under 35 U.S.C. 154(b) by 222 days.

(21) Appl. No.: 10/693,585

(22) Filed: Oct. 24, 2003

(65) Prior Publication Data

US 2005/0091213 A1 Apr. 28, 2005

(51) Int. Cl.
G06F 7/00 (2006.01)
G06F 17/30 (2006.01)
(52) U.S. Cl. .............................. 707/9; 707/8; 713/185; 713/183; 713/155; 713/167
(58) Field of Classification Search ................. 713/201, 713/202, 185, 183, 155, 167; 726/10, 14; 709/225; 455/437; 707/10
See application file for complete search history.

(56) References Cited

U.S. PATENT DOCUMENTS

| 5,655,077 | A | 8/1997 | Jones et al. | |
|---|---|---|---|---|
| 5,774,551 | A | 6/1998 | Wu et al. | |
| 5,864,665 | A | 1/1999 | Tran | |
| 6,609,198 | B1 | 8/2003 | Wood et al. | |
| 6,651,168 | B1 * | 11/2003 | Kao et al. | 713/185 |
| 6,799,178 | B2 * | 9/2004 | Iwase et al. | 707/10 |
| 6,807,636 | B2 * | 10/2004 | Hartman et al. | 726/14 |
| 6,982,962 | B1 * | 1/2006 | Lunsford et al. | 370/278 |
| 7,065,360 | B2 * | 6/2006 | Yahagi | 455/437 |

(Continued)

FOREIGN PATENT DOCUMENTS

RU 2158444 C2 10/2000

OTHER PUBLICATIONS

Rathbone, "Windows XP for Dummies", Wiley Publishing Inc, 2001, pp. 62-64, 66, 106-107, 128 and 314.

(Continued)

Primary Examiner—Jean M Corrielus
Assistant Examiner—Giovanna Colan
(74) Attorney, Agent, or Firm—Lee & Hayes, PLLC

(57) ABSTRACT

A credential is translated with one of different credential provider modules each translating a corresponding different type of credential into a common protocol. The translated credential is communicated through an API to a logon UI module to an operating system (OS) of a local machine. An OS logon module is called by the logon UI module to authenticate the translated credential against a credential database. A user identified by the translated credential is logged on to access the local machine when the authentication is successful. The credential can also be used with a selection received from the logon UI module via a corresponding one of different pre-log access provider (PLAP) modules that each communicate with the API. The API establishes a network session with an access service specified by the selected PLAP module when the credential is authenticated with the credential database.

16 Claims, 15 Drawing Sheets

U.S. PATENT DOCUMENTS

| | | | |
|---|---|---|---|
| 7,178,025 | B2 | 2/2007 | Scheidt et al. |
| 2002/0031230 | A1 | 3/2002 | Sweet et al. |
| 2002/0038333 | A1 | 3/2002 | Evans et al. |
| 2002/0112155 | A1 | 8/2002 | Martherus et al. |
| 2003/0046392 | A1* | 3/2003 | Wen et al. .................. 709/225 |
| 2003/0065626 | A1 | 4/2003 | Allen |
| 2003/0097574 | A1* | 5/2003 | Upton ........................ 713/183 |
| 2003/0177388 | A1* | 9/2003 | Botz et al. .................. 713/201 |
| 2003/0212904 | A1 | 11/2003 | Randle et al. |
| 2004/0039909 | A1 | 2/2004 | Cheng |
| 2004/0139355 | A1* | 7/2004 | Axel et al. .................. 713/202 |
| 2004/0243824 | A1 | 12/2004 | Jones |
| 2005/0091213 | A1 | 4/2005 | Schutz et al. |
| 2005/0188313 | A1 | 8/2005 | Matthews et al. |
| 2005/0188314 | A1 | 8/2005 | Matthews et al. |
| 2005/0188317 | A1 | 8/2005 | Matthews et al. |
| 2005/0235148 | A1 | 10/2005 | Scheidt et al. |
| 2005/0268107 | A1 | 12/2005 | Harris et al. |
| 2006/0075475 | A1 | 4/2006 | Boulos et al. |
| 2006/0085752 | A1 | 4/2006 | Beadle et al. |
| 2006/0174308 | A1 | 8/2006 | Fuller et al. |
| 2006/0174323 | A1 | 8/2006 | Brown et al. |
| 2006/0242427 | A1 | 10/2006 | Ruzyski et al. |
| 2007/0106892 | A1 | 5/2007 | Engberg |
| 2007/0186106 | A1 | 8/2007 | Ting et al. |

OTHER PUBLICATIONS

Debian Admin, "Enable and Disable Ubuntu Root Password", Sep. 28, 2006, <<http://www.debianadmin.com/enable-and-disable-ubuntu-root-password.html>>.

Debian Administration, "Giving ordinary user root privileges, selectively.", Oct. 16, 2004, retrived at <<http://www.debian-administration.org/articles/33/print>>.

Direct User Switching Task for Windows XP, Aug. 24, 2003, retrived at <<http://web.archive.org/web/20030824072430/www.waybeyonduk.com/DUST/>>.

"GKSU: A gtk+ su front end Linux Man Page" retrived at <<http://www.penguin-soft.com/peguin/man/1/gksu.html>>.

Ha, "Red Hat Linux Getting Started Guide", Apr. 8, 2003, Red Hat, Incorporated, retrived at <<http://web.archive.org/web/20030418075045/http://www.redhat.com/docs/manuals/linux/RHL-p-Manual/getting-started-guide/.>> pp. 35, pp. 74-75, pp. 105, pp. 146.

Ha, "Red Hat Linux Security Guide", Red Hat Docs, Apr. 8, 2003, retrived at <<http://web.archive.org/web/20030418075045/http://www.redhat.com/docs/manuals/linux/RHL-9-Manual/getting-started-guide/.>> pp. 26-pp. 28.

Lawrence, "Using Sudo", Linus Tutorials, May 12, 2005, retrieved at <<http://web.archive.org/web/20050530041932/www.developertutorials.com/tutorials/linux/using-sudo-050511/page1.html>>.

Learning the shell, "Permissions", retrieved at <<http://www.linuxcommand.org/Its0070.php>>.

Linuxtopia, "Ubuntu FAQ Guide: Chapter 6- Users Administration", May 31, 2005, retrieved on <<http://web.archive.org/web/20060523005037/http://linuxtopia.org?online_books/system_administration_books/ubuntu_starter_guide/index.html>>.

Man Pages, "Ls.", retrived at <<http://www.linuxcommand.org/man_pages/ls1.html>> on Apr. 9, 2009.

Microsoft help and Support, "How to make files and folders private in Windows XP so that only you have access to them", retrived at <<http://support.microsoft.com/kb/930987/en-us>>.

Miller, "Sudo Manual", Jul. 11, 2004 retrived at <<http://web.archive.org/web/20040711020526/http://www.gratisoft.us/sudo/man/sudo.html>>.

Miller, "Sudoers Manual", Jul. 11, 2004, retrived at <<http://web.archive.org/web/20040711020555/www.gratisoft.us/sudo/man/sudoers.html>>.

Quick HOWTO: Ch09 : Linxus Users and Sudo, Dec. 23, 2005, retrived at <<http:web.archive.org/web/20060203023004/http://www.linuxhomenetworking.com/wiki/index.php/Quick_HOWTO_:_Ch09_:_Linux_Users_and Sudo>>.

Sweet et al., "KDE 2.0 Development: 5.3. STandard Dialog Boxes", 2000, retrived at <<http://developer.kde.org/documentation/books/kde-2.0-development/index.html>>.

The Elder Geek on Windows XP, "Switch User in Windows XP", retrived at <<http://web.archive.org/web/20041215071735/theeldergeek.com?HT0_005.htm>>.

"The KDE su Command", Nov. 20, 2004, retrieved on <<http://www.lino.org/kdesu.html>>.

"The Ubuntu Quick Guide. Chapter 3. Applications Menu: System Tools.", retrieved on <<http://people.ubuntu.com/~mako/docteam/quickguide/ch03s07.html>>.

Ubuntu Documentation RootSudo, Dec. 31, 2005, retrieved at <<https://help.ubuntu.com/community/RootSudo>>.

Using Windows XP, Computer Setup and Maintenance, "How to switch between users" Sep. 7, 2006, retrieved at <<http://www.microsoft.com/windowsxp/using/setup/winxp/switchusers.mspx>>.

Gamma, et al., "Design Patterns", 1995, Addison-Wesley, Reading, MA, USA, pp. 139-143, 148-150.

Pittaway, "Distributed security services in Microsoft Windows NT 5.0—Kerberos and the active directory", Information Security Technical Report, Elsevier Advanced Technology, vol. 4, 1999, pp. 20-21.

Wiseman, "Adding Security Labelling to Windows NT", Information Security Technical Report, Elsevier Advanced Technology, vol. 4, 1999, p. 20-21.

Lai, et al., "User Authentication and Authorization in the Java Platform", INSPEC, 1999, pp. 285-290.

Andress et al., "Test Center-New Products Test In Real-World Enviroments", Trinity 3.3, Information Security Magazine, Jan. 2002. Retrieved from the Internet.

* cited by examiner

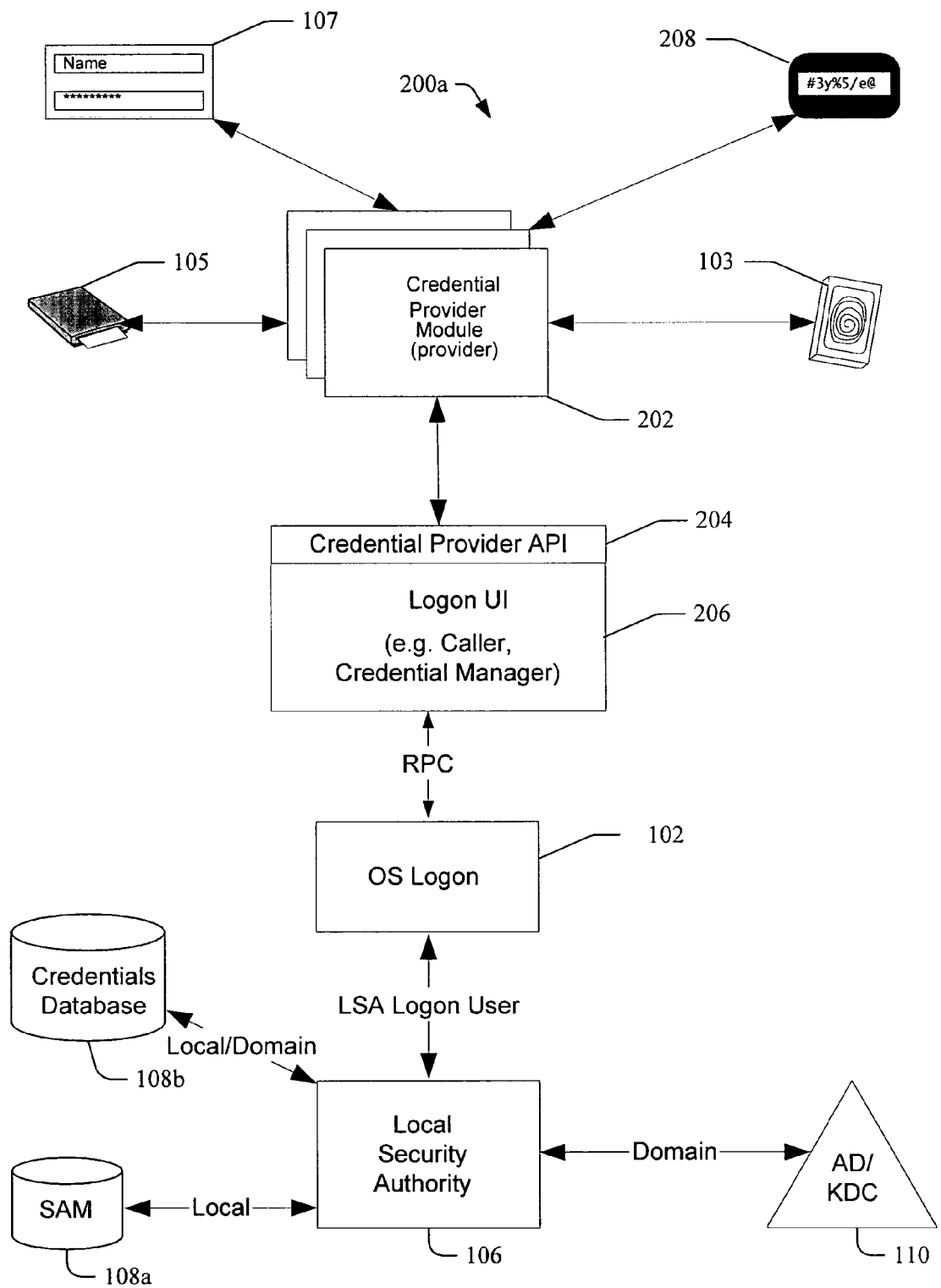

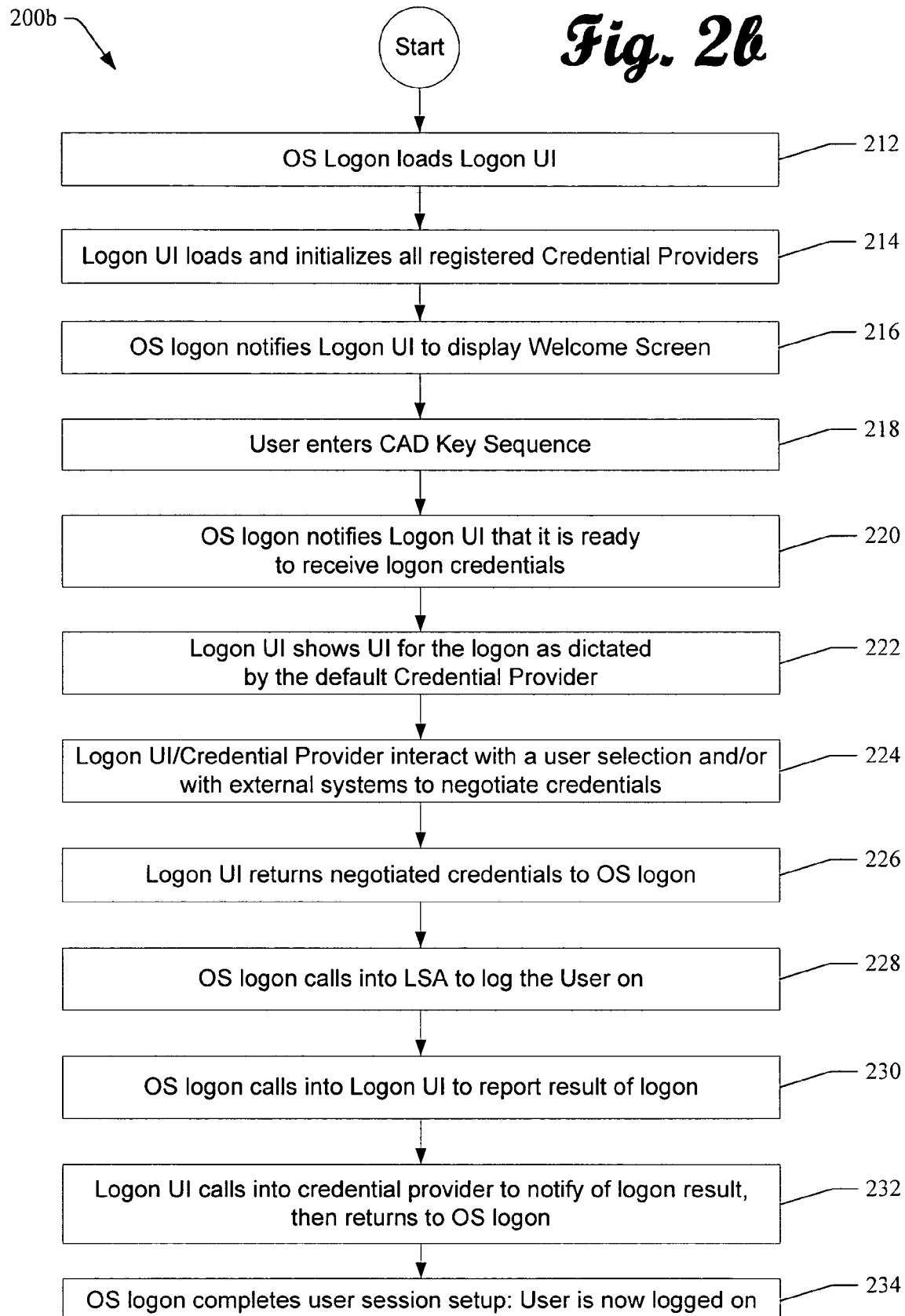

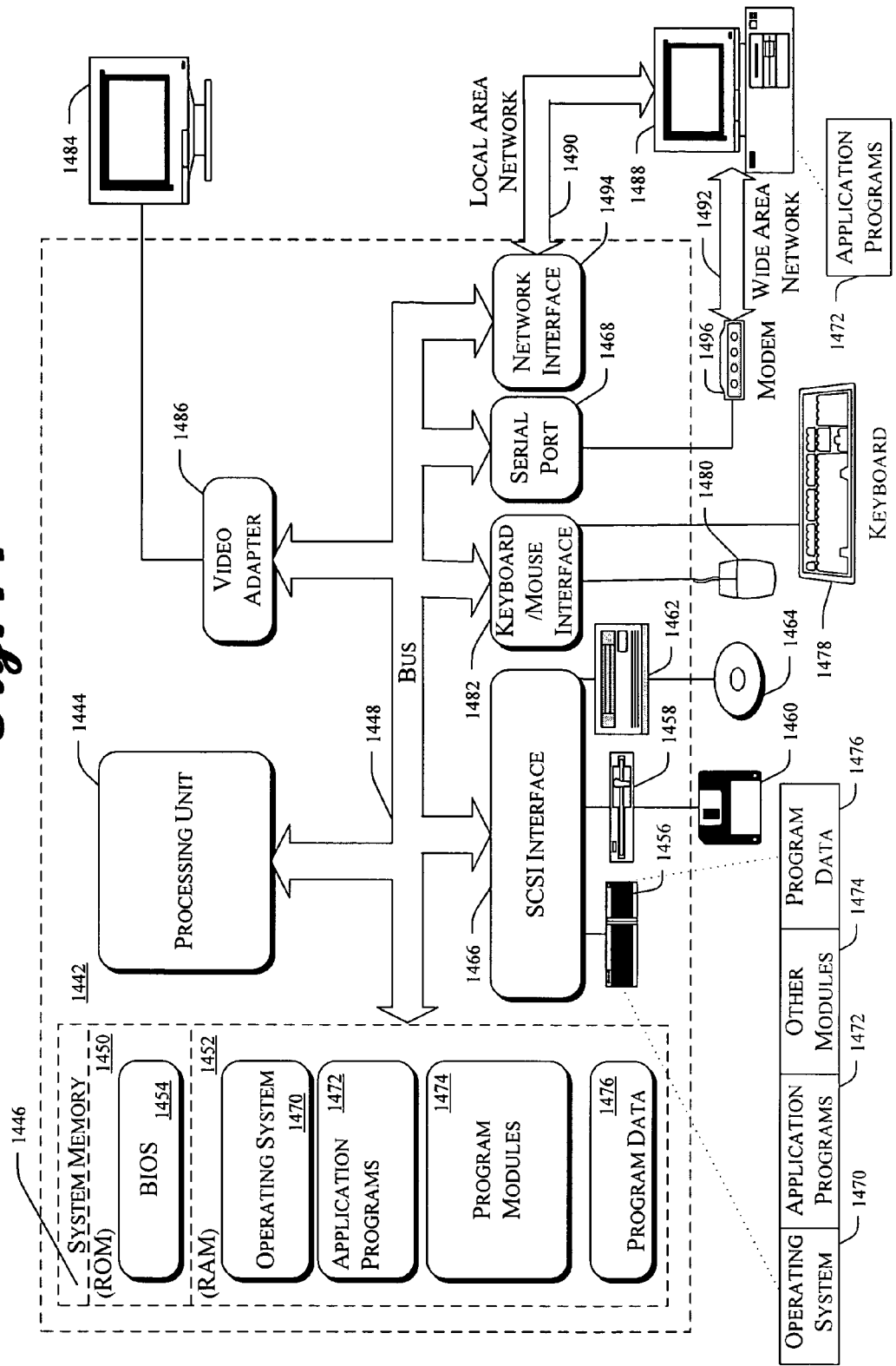

INTEROPERABLE CREDENTIAL GATHERING AND ACCESS MODULARITY

TECHNICAL FIELD

The present invention relates generally to machine access and more particularly to the identification and authentication of an entity, user, or principal with a credential for logging on to a local and/or remote machine having an operating system.

BACKGROUND

An exemplary conventional process 100 is seen in FIG. 1 for allowing a user to login to an authentication infrastructure of an operating system for a local machine. As used herein, a local machine is a computing device with an operating system, such as a personal computer, a handheld computer, a thick client device, a thin client device, a personal digital assistant, an expert system, etc. The authentication infrastructure authenticates the user using a credential in order to gain access to the computing device via its operating system, such as the WINDOWS® operating system provided by Microsoft Corporation of Redmond, Wa., USA. The authentication of a credential is intended herein to be equivalent to the authentication of a user, entity, or principal with a corresponding credential, which phrases and concepts are used herein interchangeably.

At block 102 of process 100, the operating system executes a logon program. The logon program can pass control to only one of three (3) different authentication modules. Stated otherwise, the local machine can only have one authentication module with which an authentication can be performed. In the case of the WINDOWS(® operating system (OS), the default authentication module is a Graphical Identification and Authentication module, referred to herein as a 'GINA'. The GINA, in the WINDOWS® OS, is a module in a dynamic link library (*.dll) that implements a logon user interface for a display of a screen that includes a logon dialog box into which a user inputs a username and password. The GINA is present to authenticate the user through the operating system of the computing device by use of credentials presented by the user. The user's credentials are represented by a set of information that includes identification, and proof of identification, that is used to gain access to local and network resources.

Examples of credentials are usernames and passwords, smart cards, biometric credentials, X.509 digital certificates, and other kinds of certificates. A GINA 104 seen in FIG. 1 is a standard WINDOWS® OS module and requires a conventional interactive logon process, such as by prompting a user to enter a username and a password at a user interface 103. After GINA 104 is executing, control is passed to a Local Security Authority (LSA) module 106. The LSA module 106 accesses a local Security Accounts Manager (SAM) database 108a, each of which are local stores for logon and security information for the computing device and/or for the relevant environment. A credentials database 108b, which can be local or remote, can store credentials such as fingerprints, passwords, retinal information, face recognition information, and other biometric information that can be used to authenticate a user in conjunction with a custom GINA. The LSA module 106 can also establish a connection to access a remote credential database, a token protocol credential service, a challenge and response protocol credential service, and/or an Active Directory (AD) and Kerberos Distribution Center (KDC) 110. Kerberos is a network authentication protocol to identity users that are attempting to log on to a network and to encrypt their communications through secret-key cryptography. The AD module uses a technology that enables applications to find, use, and manage directory resources (e.g., usernames and permissions) in a distributed computing environment. From these accesses, identification and authentication is performed for a user with the user's credentials so as to determine the user's access privileges to logon to the computing device via its operating system. A successful identification and authentication will log the user on and will return control to the OS logon module 102. The user will then be logged on and can proceed to use the computing device.

A first type pass-through GINA module 112, seen in FIG. 1, is a customized identification and authentication module, such as may be written by an independent software vendor that did not develop the operating system. The first type pass-through GINA module 112 interfaces with a smart card reader 105 and also interfaces with a default original operating system GINA 114 module. The first type pass-through GINA module 112 receives credentials read by the smart card reader 105 from a smart card inserted therein. A certificate read from a smart card inserted into smart card reader 105, and any other credentials acquired from a user, can be used to identify and authenticate the user against the credentials database 108b. In this case, first type pass-through GINA module 112 allows limited modifications to be made to the process of the identification and authentication of a user, while maintaining default behavior of the identification and authentication due to the interface with the original operating system GINA 114 module.

A second type pass-through GINA module 116 is a complete replacement for the standard GINA 104 for the operating system. The second type pass-through GINA module 116 interfaces with a fingerprint reader 107. The second type pass-through GINA module 116 receives credentials read by the fingerprint reader 107 from an optically scanned finger impression. The optically scanned finger impression from a finger inserted into fingerprint reader 107, and any other credentials acquired from a user, can be used to identify and authenticate the user against the credentials database 108b. The second type pass-through GINA module 116 is a customized identification and authentication module that does not interface with a standard GINA of the OS, but rather directly interfaces with LSA 106. Unlike the first type pass-through GINA module 112, the second type pass-through GINA module 116 allows for full control of a user interface that a user sees when logging on. A typical problem, as mentioned above, is that only one of the GINA 104, the first type pass-through GINA module 112, and the second type pass-through GINA module 116 can be used with an operating system. Stated otherwise, no custom or default GINA can coexist with any other custom GINA through which the OS can log a user on to the computing device or computing environment.

In addition to the foregoing, other limitations with custom GINAs can arise, such as in implementing any new credential gathering mechanism or a change thereto (e.g., for biometrics, smart cards, tokens, etc.) in order to access an operating system of a computing device. As such, custom GINAs place a significant coding burden on a developer. To implement the new or changed credential gathering mechanism, the developer has to write a new authentication model for authenticating a user who wishes to gain access to the computing device. In the case of the WINDOWS® OS, the developer must write a major revision to a custom GINA that includes complex interface and state management code so that the custom GINA can interact directly with system components of the OS. Poor coding in the custom GINA can undermine the robustness of the OS.

The replacing of the custom or default GINA is particularly sensitive in that it is one of the most vital security components of the OS. A poorly replaced GINA can greatly weaken the robustness of the OS and can reduce pre-existing functionality. The complexity of developing a replacement or custom GINA may also require the developer to obtain the underlying source code for the standard GINA of the OS. Furthermore, deploying a custom GINA means replacing the default GINA because two credential gathering methods (e.g., GINAs) cannot not coexist on the same computing device. This prevents independent software vendors from building solutions that are deployable anywhere to allow users to logon with more than one authentication infrastructure. It would be an advantage in the art to provide a logon solution that allowed users to log into different, coexisting authentication infrastructures, such as through a selectable network session, where the logon solution overcomes the aforementioned problems.

SUMMARY

In various implementations, a credential is translated with a corresponding one of a plurality of different and coexisting credential provider modules. Each module translates a corresponding different type of credential into a common credential protocol. The translated credential is communicated through a credential provider application program interface (API) to a logon user interface (UI) module of a native operating system (OS) of a local machine. A logon routine for the OS is called to authenticate a user with the translated credential against a credential database. The user identified by the translated credential is logged on to access the local machine when the authentication is successful.

In other implementations, a request is made with the logon UI module of the OS via a pre-logon access provider (PLAP) manager API to the logon UI. The request that is made is for a flat list of access services from a corresponding plurality of coexisting different PLAP modules. The flat list of access services is displayed on a display rendered by the logon UI module. An input of a credential and a selection of one access service from the flat list on the display are received. When a connection to a network is established using the selected access service, the credential is passed to a credential database at the access service for a first authentication. When the first authentication is successful, the credential is communicated from the PLAP API to the logon UI module. An RPC call is made from the logon UI module to pass the credential to an OS logon module. The credential is then passed from the OS logon module with an LSA logon user call to an LSA. A second authentication is then performed with the LSA against a credential database. When the second authentication is successful, a user that is identified by the credential is logged on to use a local machine executing the OS.

BRIEF DESCRIPTION OF THE DRAWINGS

A more complete understanding of the implementations may be had by reference to the following detailed description when taken in conjunction with the accompanying drawings wherein:

FIGS. 2a-2b are respective flow charts depicting respective implementations of a process for a plurality of default or custom alternative credential providers to respectively identify and authenticate a user with credentials provided by the user in order for the user to logon to a local machine, where the user can optionally select one of the several credential provider modules, and where each credential provider module is interoperable with the operating system so as to provide credentials that are compatible for authentication with the operating system.

FIG. 14 illustrates an example of a computing environment within which the software applications, methods and systems described herein can be either fully or partially implemented.

Figure 1:
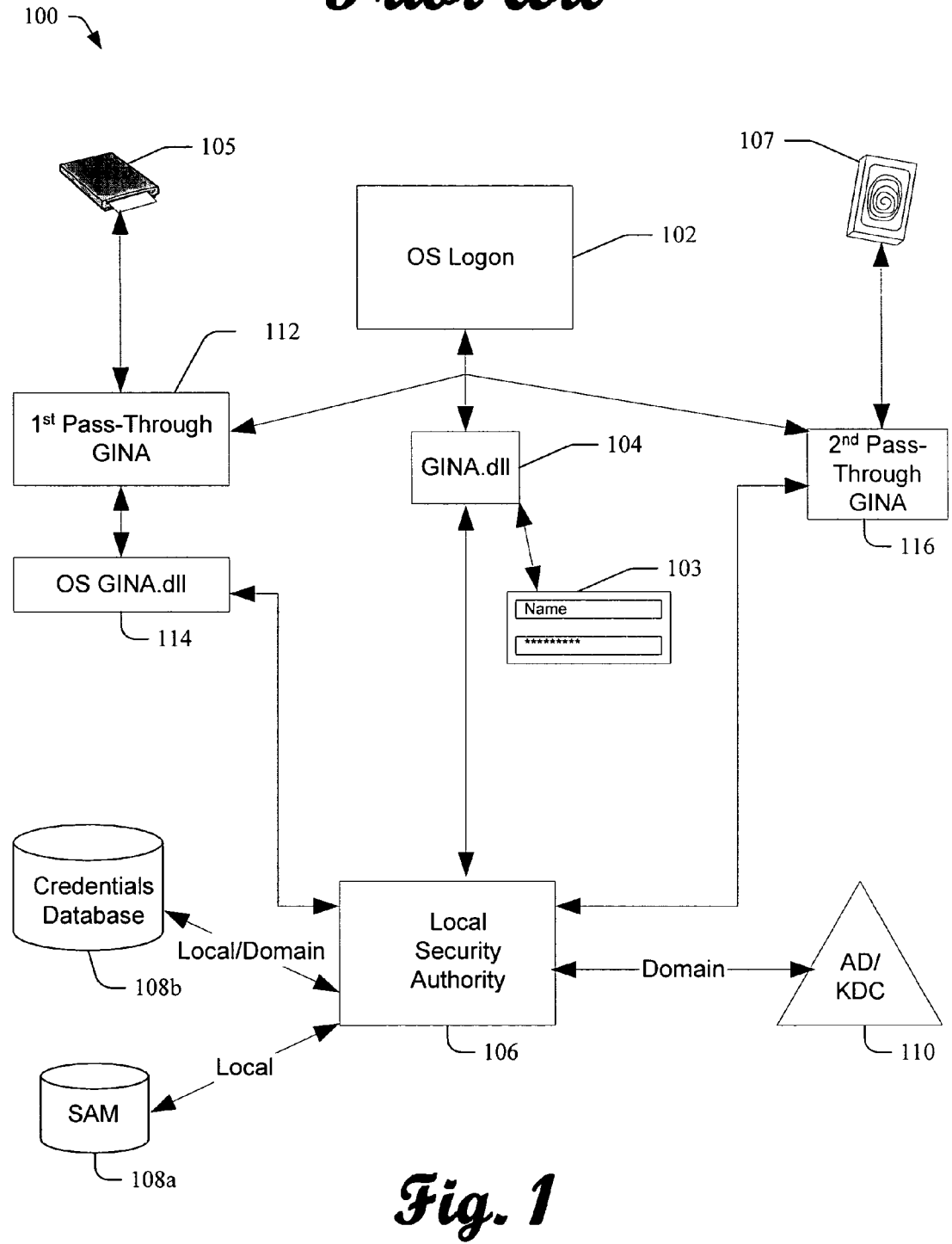
FIG. 1 shows a flow chart depicting a conventional process in which a user logs on to a local machine by providing credentials for identification and authentication.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

Various implementations provide coexisting modules that interface and are interoperable with an operating system of a computing device, where each module can receive and authenticate a principle, entity, or user with a set of information (e.g., credentials) that includes identification, and proof of identification, that is used to gain access to local and network resources via the operating system. Moreover, by maintaining the stability of the interface between the modules and the operating system, changes can be to any one of the modules and to the operating system without affecting the identification and authentication processes performed by the other modules.

FIG. 2a depicts a flowchart illustrating an exemplary process 200a for identifying and authenticating users to be logged on and thereby gain access to local and network resources via an operating system of a local machine. A plurality of credential provider modules 202 has been provided by various independent software vendors, any one of which can be used by the local machine to identify and authenticate the users. As such, the credential provider modules 202 are coexisting interfaces to the operating system through which a user can be logged on to the local machine through its operating system.

Each credential provider module 202 uses a different identifying and authenticating process. One credential provider module 202 uses a user interface (UI) 107 that receives a username and password as the credentials. Another credential provider module 202 uses a token 208. By way of example, token 208 can be a physical device. The physical device stores a number that is read by a reader when a user tries to login to a computing device. After each such login, or at periodic intervals via a time based algorithm, the number stored in token 208 changes. The new number can also be stored in the computing device for future authentications. The user may also be prompted to input a Personal Identification Number (PIN) in addition to having the reader read the token 208. The fingerprint reader 103 and/or the smart card reader 105 can be used by yet other respective credential provider modules 202 to respectively read a fingerprint as the credentials of a user's finger impressed on the fingerprint reader 103 and to read credentials from a smart card inserted into the smart card reader 105. Of course, other credential readers can be used to provide credentials to still different credential provider modules 202, such as an eye retina scanner module, a face recognition camera module, a gate or walk recognition camera module, a handwriting recognition module, a voice recognition module, a scent recognition module, a genetic code recognition module, and other such biometric modules.

Various alternatives are available for use of the coexisting credential provider modules 202. For instance, a local machine can require that all or certain users authenticate with multiple authentication methods. By way of example of such a multi-method authentication requirement, a user may be required to authenticate with two different smart cards in order to log on to the local machine. In another example, a user may be given a choice as to which of multiple ways the user will use to log on to the local machine. For instance, the user can choose to either type in a password or to insert a finger on to a fingerprint sensor in order to log on to the local machine.

Each credential provider module 202 can receive and translate a credential into a common credential protocol. The credential protocol of the translated credential makes it compatible for authentication by an authentication component of a native operating system of a local machine. The authentication of the translated credential is made against a credential database. When the authentication is successful, a user identified by the credential will be logged on to the native operating system for access to the local machine.

Each credential provider module 202 interfaces with a credential provider Application Program Interface (API) 204 in order to handle communications with an authenticator. The credential provider API 204 interfaces with a caller that can be a logon User Interface (UI) 206. Logon UI 206 can be a credential manager for receiving and managing credentials from a user. Logon UI 206 uses a Remote Procedure Call (RPC) to an operating system (OS) logon module 102. The OS Logon 102 is an interface to the OS of the computing device. The OS Logon 102 performs a Local Security Authority (LSA) logon user call to the Local Security Authority (LSA) module 106. As described above with respect to FIG. 1, the LSA module 106 accesses the local Security Accounts Manager (SAM) database 108a for typical username and password identification and authentication. The LSA module 106 can also access the locally stored credentials database 108b to identify and authenticate a principal, entity or user with credentials gathered by a reading device, such as one of the credential reading devices 103-107 and 208.

The translated credentials are communicated through the credential provider API 204 to the logon UI 206 for communication to the OS logon 102 for local authentication through LSA module 106 so as to log the user on to the local machine. Alternatively, the LSA module 106 can perform a remote access outside of the local machine through a connection that is established to a domain. An Active Directory (AD) and Kerberos Distribution Center (KDC) 110 are stored at the domain and can be accessed. From these accesses, identification and authentication is performed for the user with the translated credentials so as to determine the user's access privilege to logon to the local machine via the OS. A successful identification and authentication will log the user on. The user, then logged on through the OS, can proceed to use the local machine.

An exemplary general logon process 200b is seen in FIG. 2b and will be described by reference to FIG. 2a. The logon process 200b begins at block 212 at which an OS (OS) of the local machine loads the logon User Interface (UI) 206. At block 214, the logon UI 206 loads and initializes all registered credential providers 202 using credential provider API 204.

At block 216, the OS logon 102 notifies logon UI 206 to display a welcome screen on the UI for the user to see and interact with. At block 218, the user enters a control-alt-delete (CAD) key sequence. When a user enters the CAD key sequence, or another key sequence that is also a Secure Attention Sequence (SAS), a hardware event is generated that preferably only the OS can intercept. This user action causes the OS logon 102 to notify the logon UI 206 that it is ready to receive logon credentials at block 220. At block 222, the logon UI 206 shows the UI for the logon as dictated by the default credential provider module 202. The logon UI 206 requests the credential provider modules 202 to provide a flat list of all credential providers for display. At block 224, the logon UI 206 receives input signifying the user's choice of one of a plurality of displayed credential providers that each correspond to one of the credential provider modules 202. This input initiates an interaction between the user's input and one or more external systems through the credential provider API 204. The particular credential provider module 202 can be dependent upon the type of event that the user initiated to provide credentials to the OS (e.g., by the user's use of one of the credential reading devices 103-107 and 208). At block 226, the logon UI 206 returns negotiated credentials to OS logon 102 through an RPC. At block 228 the OS logon 102 performs a LSA logon user call into the LSA 106 to log the user on. At block 230, the OS logon 102 performs an RPC into Logon UI 206 to report the result of the logon process 200b. At block 232, the logon UI 206 calls into the particular credential provider module 202 through the credential provider API 204 to report the result of the logon process 200b. Control then returns to the OS logon 102. At block 234, the OS logon 102 completes the user session setup such that the user is logged on to the computing device.

Figure 3:
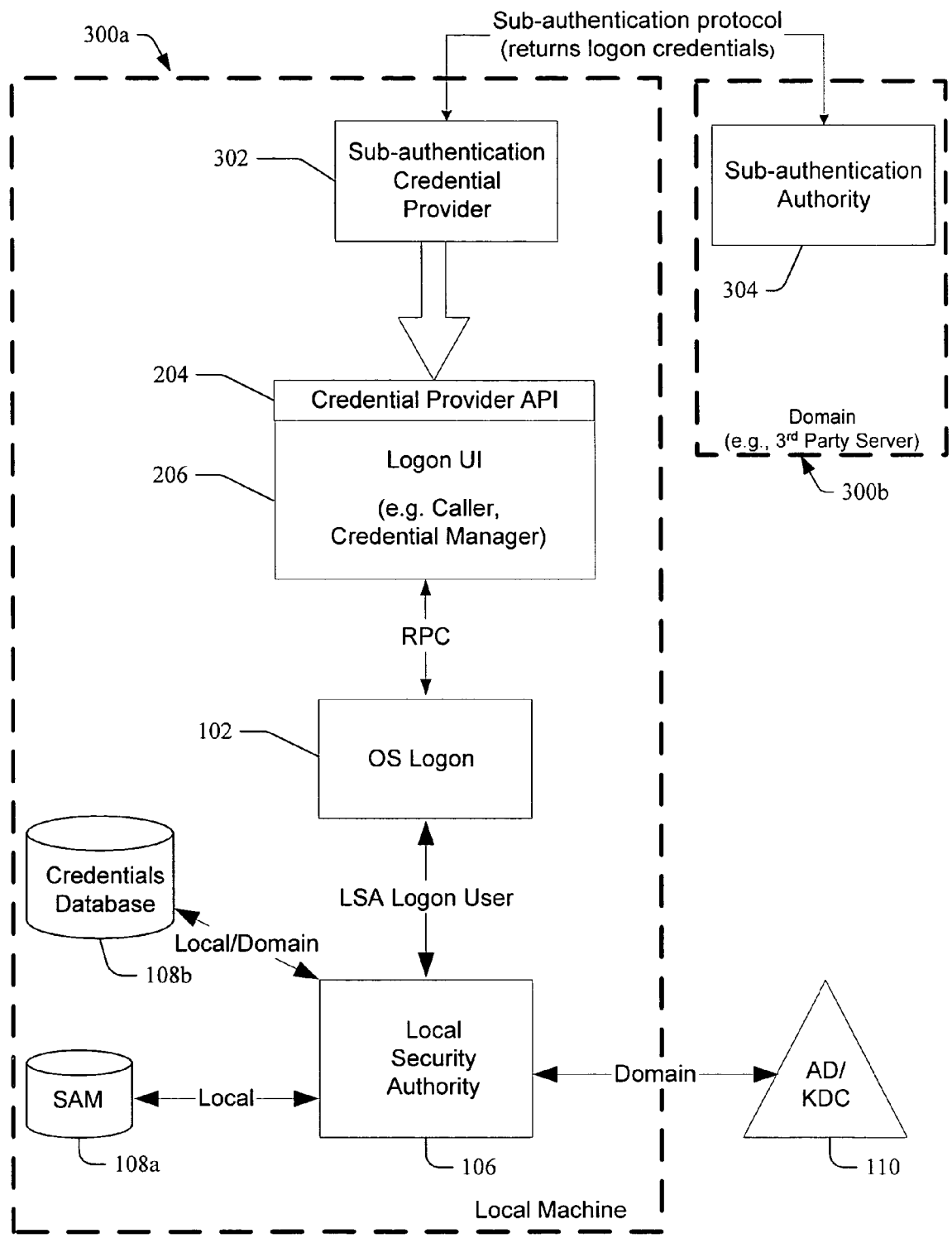
FIG. 3 is a flow chart depicting an implementation of a process for a sub-authentication credential provider to identify and authenticate a user with credentials provided by the user at a domain of a sub-authentication authority in order for the user to logon to a local machine, where the sub-authentication authority returns logon credentials to the sub-authentication credential provider, and where the sub-authentication credential provider provides credentials that are compatible for authentication with the operating system.

A process 300, seen in FIG. 3 and depicted by way of a flowchart, shows steps by which a local machine 300a can use a sub-authentication process at a domain 300b to authenticate a user with the user's credentials. A sub-authentication credential provider 302 at the local machine 300a interfaces with a sub-authentication authority 304 at a domain 300b. The domain 300b, for instance, can be a third party server. The sub-authentication credential provider 302 interfaces with the credential provider API 204 as discussed above with respect to FIG. 2. As such, process 300 is similar to process 200a with respect to blocks 206, 102, and 106. In process 300, the AD/KDC 110 interfaces with LSA 106. The sub-authentication authority 304 at the domain 300b uses a sub-authentication protocol to return logon credentials to the sub-authentication credential provider 302.

Process 300 uses a pre-authentication process in which a user's credentials are used to authenticate the user against a third party's method of authentication, instead of that of the local machine. Following the authentication, the third party's method returns credentials which are compatible with the OS so as to log the user into the local machine 300a through its OS. In practice, the sub-authentication credential provider 302 interfaces through credential provider API 204 with logon UI 206 seen in FIG. 3. When a user enters credentials, the credentials are sent from the local machine 300a to the AD/KDC 110 at domain 300b, which can be a server in communication through a network to the local machine 300a. The AD/KDC 110, in conjunction with the sub-authentication authority 304 at domain 300b, authenticates the user with the user's credentials. The sub-authentication authority 304 returns logon credentials to sub-authentication provider 302. The sub-authentication provider 302 returns credentials to logon UI 206 through credential provider API 204. The logon UI 206 can then pass the credentials on to the OS logon 102 via an RPC. Accordingly, the OS at the local machine 300a is shielded from the third party's sub-authentication authority 304 at domain 300b.

Figure 4:
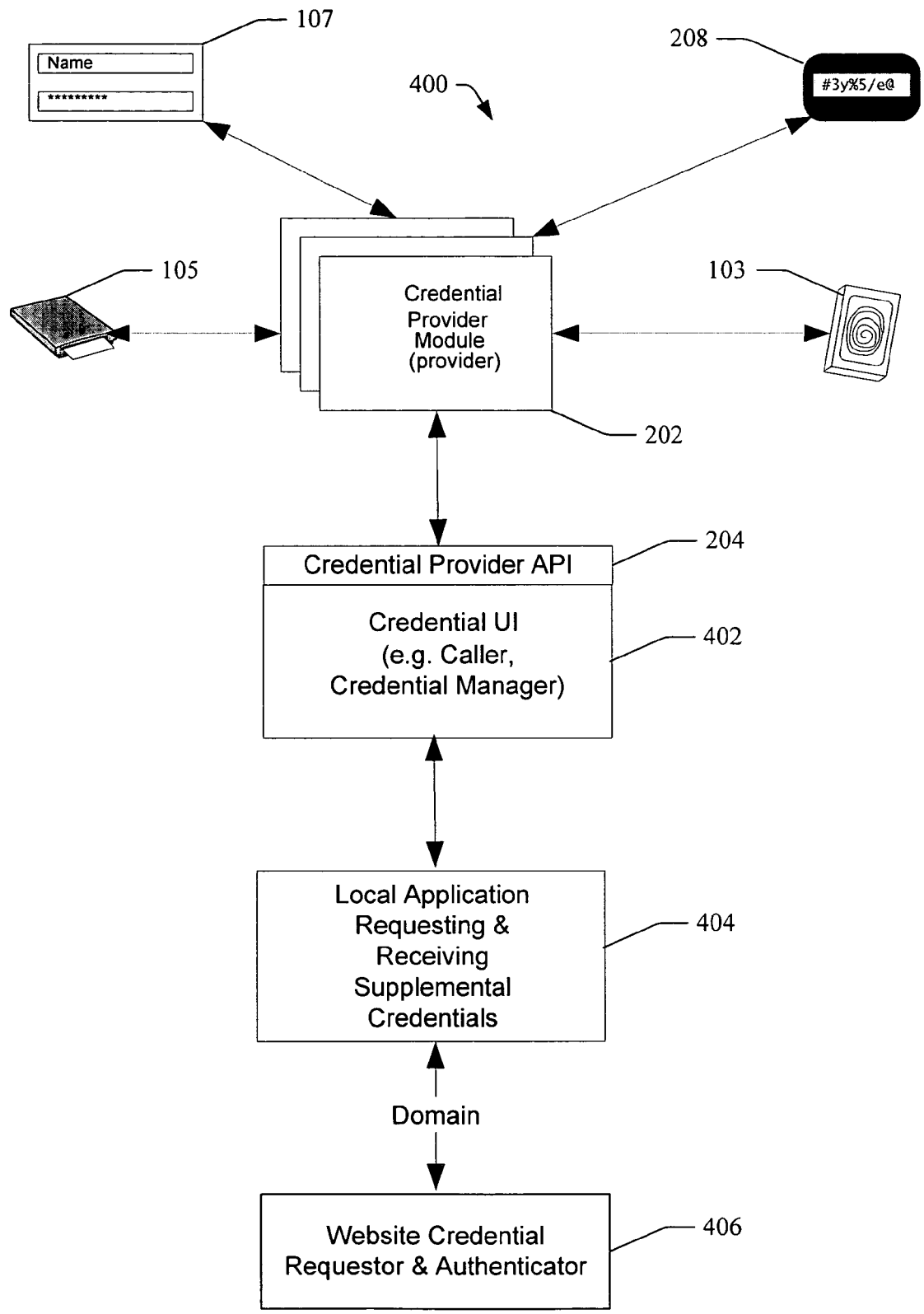
FIG. 4 is a flowchart depicting an exemplary implementation of a process in which each of a plurality of different and coexisting credential providers can gather a credential from a user at the request of an application at a local machine, and where the credential can be sent to a domain, such as at an Internet website, at which the user will be authenticated using the credential so that user can use a local machine to access the domain.

FIG. 4 shows a flowchart depicting an exemplary process 400 through which an principal, entity, or user can be authenticated by a supplemental credential for access to a domain, such as a website at which there is a website credential requestor and authenticator 406. As such, after the principal, entity, or user is logged on to a local machine, the principal, entity of user is remotely authenticated by the website credential requestor and authenticator 406 by processing the supplemental credential. A credential User Interface (UI) 402 requests the supplemental credential with an application 404 executing at a local machine. The local machine has an OS to which a user is logged on. The local machine is in communication with an input device (e.g., 103, 105, 107, and 208) by which the supplemental credential can be received. One of a plurality of different and coexisting credential provider modules 202 are used to gather the supplemental credential at the input device (e.g., 103, 105, 107, and 208) from the user. Once the supplemental credential has been gathered, it is given to the application 404 for authentication. Application 404 is a local application, executing at the local machine, that can request and receive the supplemental credential. Each of the credential provider modules 202 can gather a respectively different type of credential, such as the supplemental credential, from one of the input devices (103, 105, 107, 208), and each credential provider module 202 interfaces through a credential provider API 204 with the OS of the local machine. The credential provider API 204 receives credentials gathered by any of the credential provider modules 202, where each credential provider module 202 can provide a respective type of credential that it gathers to the credential provider API 204 for authentication of a principal, such as the user, in order to the principal log on with the OS to access the local machine.

Exemplary display screens to illustrate various implementations that provide different user logon experiences are seen in FIGS. 5a through 10 and 12. One implementation uses a username and password as input to a credential provider module which can be a default way that a user enters credentials into a logon screen. Another implementation uses a Public Key Infrastructure (PKI) smart card to acquire credentials in conjunction with a smart card credential provider module. Yet another implementation uses a credential provider module with fingerprint credentials, where the credential provider identifies and authenticates a user with the user's fingerprint via fingerprint scan.

Figure 5A:
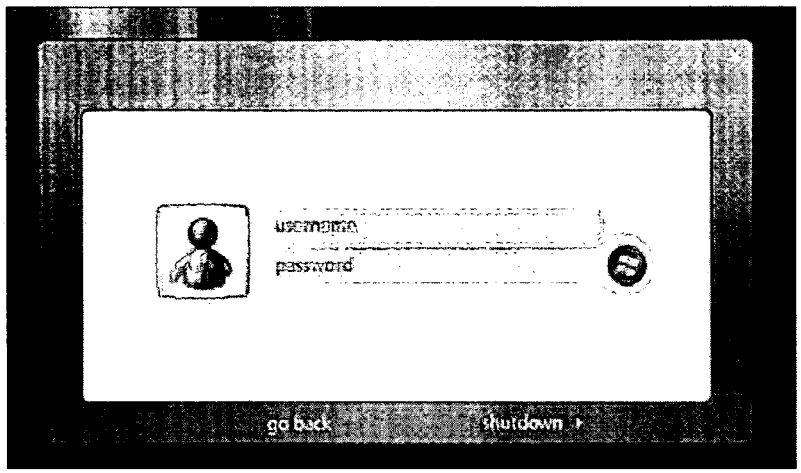
FIG. 5a shows a screen into which a user inputs username and password credentials against which an identification and authentication will be performed by a credential provider.

The implementations discussed below include credential providers that are either user selected or event driven, depending upon how the user selects a credential provider module that is to be used. A user selected credential provider is selected by a user from among two or more credential providers that are offered to the user at a user interface (UI). FIG. 5a shows an example of a default screen display for which an OS may be configured to display as the UI having only one user selected credential provider, where the UI prompts only for username and password entries. In the case of FIG. 5a, there are no additional user selected credential providers installed on the computing device that executes the OS.

Figure 5B:
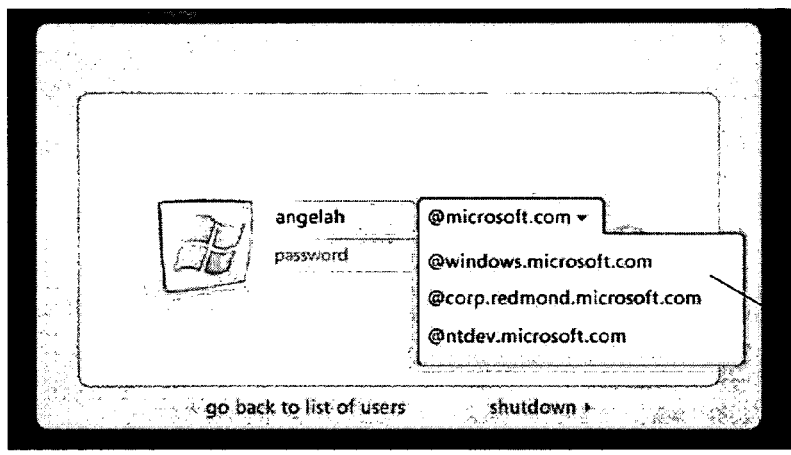
FIG. 5b shows a screen displaying multiple usernames associated with the same alias or username-prefix, which usernames are automatically displayed upon querying of a related database of usernames.

As seen in FIG. 5b, an alias or username can be common to one more electronic mail (e-mail) addresses or usernames. As such, the credential provider should be flexible with respect to the use of a Universal Principal Name (UPN) as shown. The UPN is an Internet-style logon name for the user based on the Internet standard RFC 822. By convention, this should map to the user's e-mail name. The UPN advantageously consolidates the e-mail and logon namespaces so that the user need only remember a single name. As such, the UI in FIG. 5b supports UPN style names, where an auto-complete feature provides many characters in the UPN such that the user need not key them in. To do so, a directory center (DC) can be queried and can to return the list of UPNs to the UI in FIG. 5b for display. Accordingly, the logon UI will use the UPN as the username portion of the credentials for the credential provider module. In addition, the logon UI can also be used to display an enumerated list of users if they have been joined to a castle or workgroup or to display all local machine accounts on the logon screen. The logon UI can also be used to display an enumerated list of users if they have joined to a domain, such that the UI displays icons or tiles for each user for only currently logged on users. The UI can display one (1) icon or tile for the use of a user who has not yet logged on to the domain.

Figure 5C:
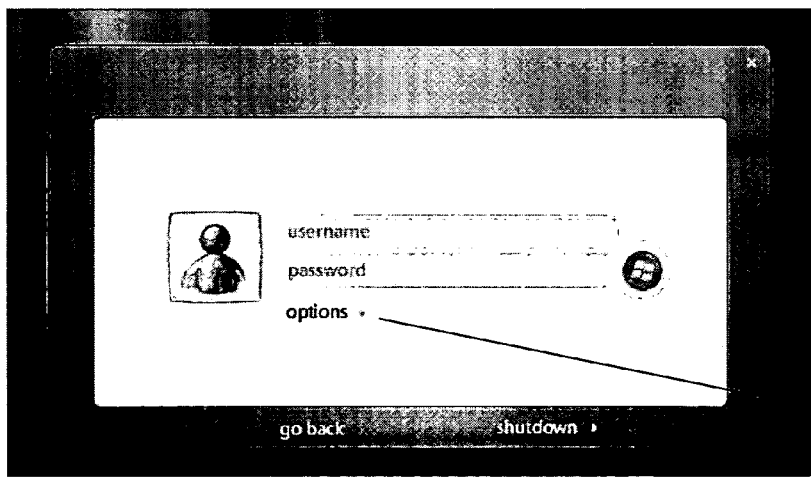
FIG. 5c shows a logon screen that allows a user to select an option that, when selected, causes a screen to be displayed for the selection of account types and for the selection of logon connection types.
Figure 6A:
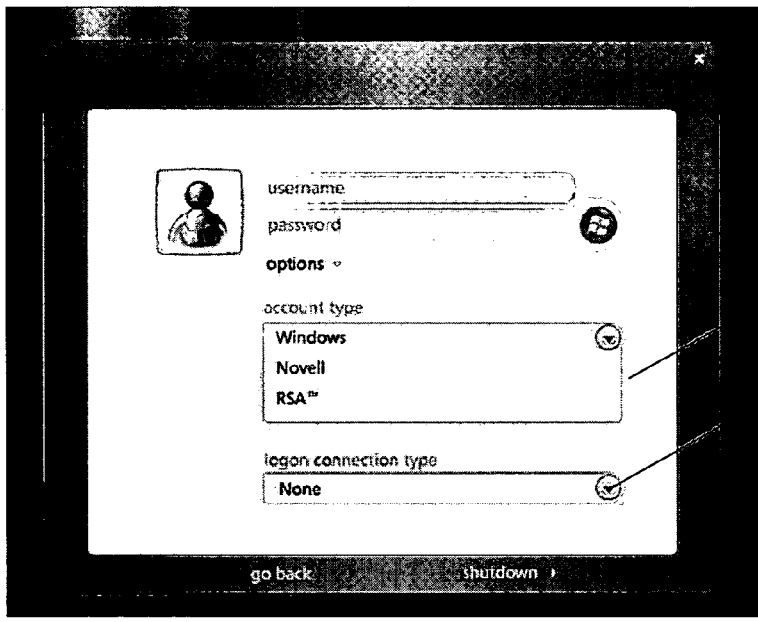
FIG. 6a shows a logon screen that allows a user to select an account type and a logon connection type from lists in respective pull down menus.

When a credential provider for a new user is installed on a local machine, the local machine can be configured to display an options link 504 that appears under the password control as seen in FIG. 5c. A user can select the options link 504 in order to be shown a list of credential providers from which the user can choose. Alternatively, a network administrator or other information professional can configure the local machine to set a policy to select a particular credential provider by default so that the users of the local machine will not have to choose the right credential provider. As seen in FIG. 6a, a list 602 of account types are displayed that correspond, respectively, to different credential providers on the UI of a screen 600a. List 602 allows a user to choose the type of account the user wants to use to log on to the OS, while a logon connection type field 604 allows a user to choose a standard or custom type of Remote Access Service (RAS) logon to use, such as a custom Virtual Private Network (VPN) connection or a custom dialer for a dial up connection. By building an expanded options section from options link 504 of FIG. 5c, advanced interoperable functionality can be incorporated into a user logon process without unduly causing an unaesthetic or complicated user logon experience.

Figure 6B:
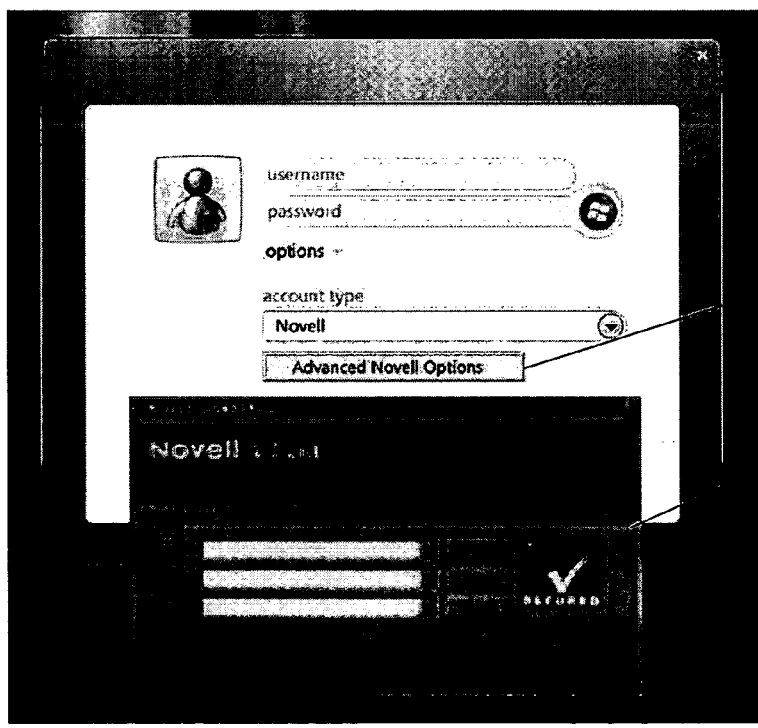
FIG. 6b shows a logon screen that is displayed after a user has selected a Novell account type, where the screen prompt for credentials to be entered into a Novell user interface.

A credential provider can provide additional functionality into a logon process as shown by the UI in the screen 600a. To get to an illustrated screen 600b of FIG. 6b, a user selects the "Novell" option in list 602 of FIG. 6a, which transitions the UI to display an Advanced Novell Options button 606. When the user clicks on the Novell Options button 606, a Novell client logon UI 608 can be displayed as shown in FIG. 6b. This functionality allows the user to browse a list of Novell servers on a network in communication with the user's local machine before logging on to the network. In such a case, the Novell credential provider can also provide support for adding logon scripts.

The sub-authentication credential provider module 402 as seen in FIG. 4 can be customized such that the user interface reflects only the branding, logo, trademark, or service mark of a third party and not that of another. In one implementation, a user can select an account type from the list 602 which activates the sub-authentication credential provider module 402. The sub-authentication credential provider module 402 can then control the UI to provide the user with a brand-specific user logon experience that is still fully compatible with the logon process for the OS. Furthermore, the local machine can have a plurality of sub-authentication credential provider modules 402 each of which can provide the user with a different and distinct brand-specific user logon experience, yet be fully compatible with the logon process for the OS of the local machine. By way of example, a personal computer can be used as an online shopping mall kiosk. The kiosk can be in communication with the Internet and can also display a plurality of icons each of which can correspond to a different sub-authentication credential provider module 402. When the user selects one of the displayed icons that represent a brand, the respective sub-authentication credential provider module 402 provides a distinct user logon experience unique to the brand while the user is logged on through the OS to the local machine and to an Internet web site that corresponds to the brand.

The UI in the screens 600a-600b seen, respectively, in FIGS. 6a through 6b provide examples relevant to user driven credential providers. The UI in the screens seen respectively in FIGS. 7a through 9c provide examples relevant to event driven credential providers. Event driven credential providers are selected based on some user action. One such user action occurs when a user inserts a smart card into a card reader. For biometrics, a user action occurs when a user puts some body part in contact with, or so as to be measured by, a biometric sensor (e.g., a fingerprint impression is read by a finger print sensor, a face is read by a camera for analysis in a facial recognition software algorithm, etc.).

Figure 7A:
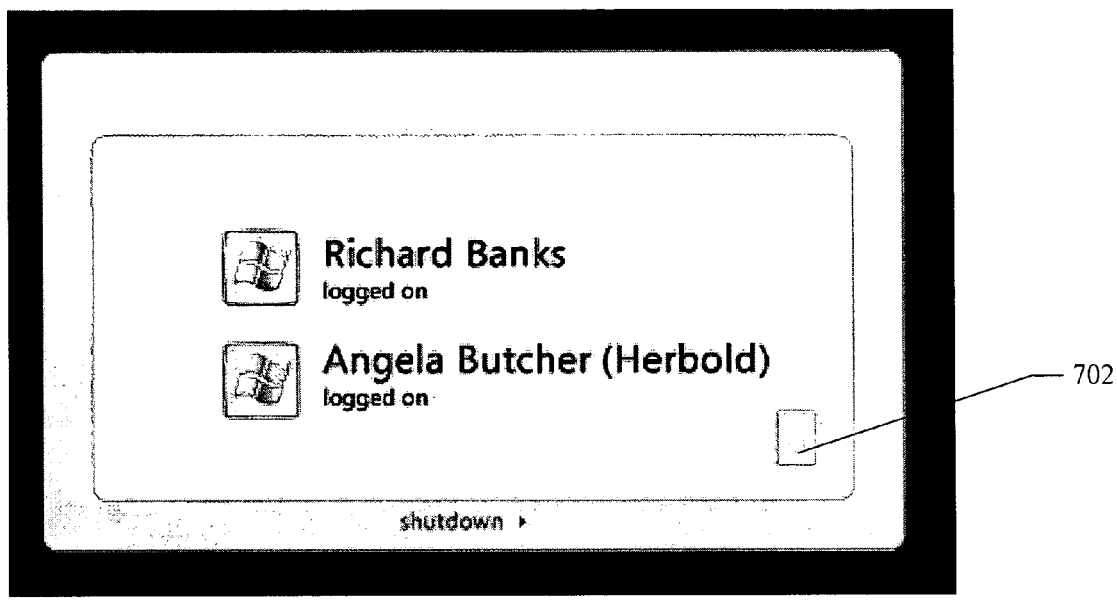
FIG. 7a is a logon screen showing two (2) accounts that are currently logged on to a local machine.

The UI in a screen 700a of FIG. 7a is displayed when a user enters the CAD key sequence (Ctrl+Alt+Del). The logon screen 700a shows that two (2) users are already logged on to the local machine. An icon 702 in FIG. 7a shows the user that smart cards can be used for logging on to the local machine. The user then inserts a smart card into a card reader, such as device 105 that is in communication with the local machine.

Figure 7B:
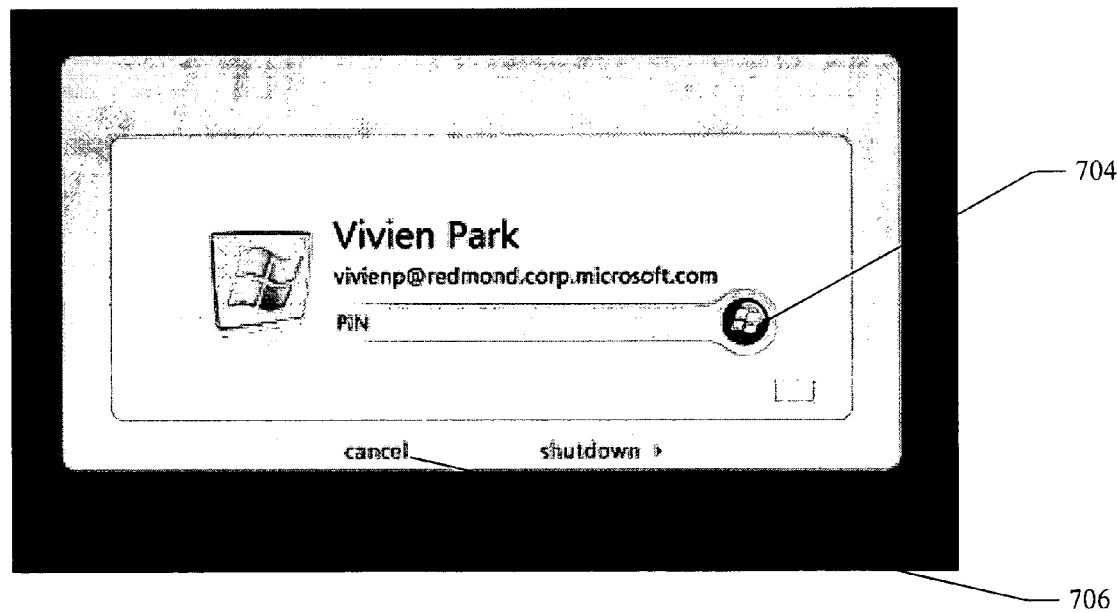
FIG. 7b is a logon screen showing a user account for which a prompt is being made to enter a Personal Identification Number (PIN) as credentials for identification and authentication to logon to a local machine.
Figure 8A:
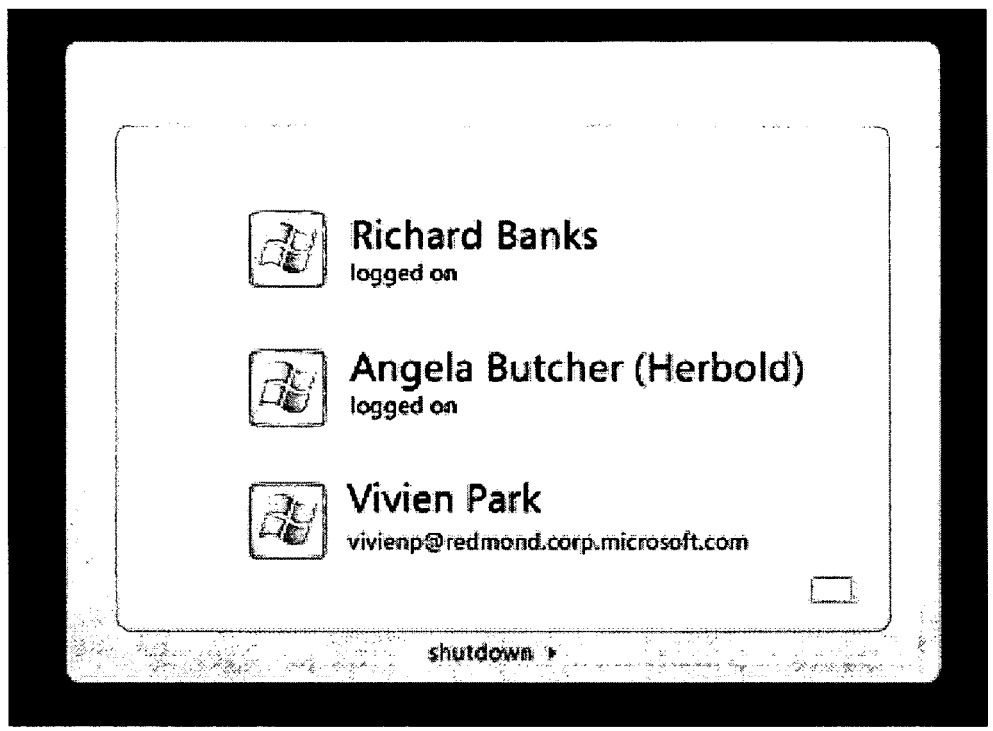
FIG. 8a is a logon screen showing two (2) accounts that are currently logged on to a local machine and a third account corresponding to certificate of a smart card being read by the local machine that is rendering the logon screen.
Figure 8B:
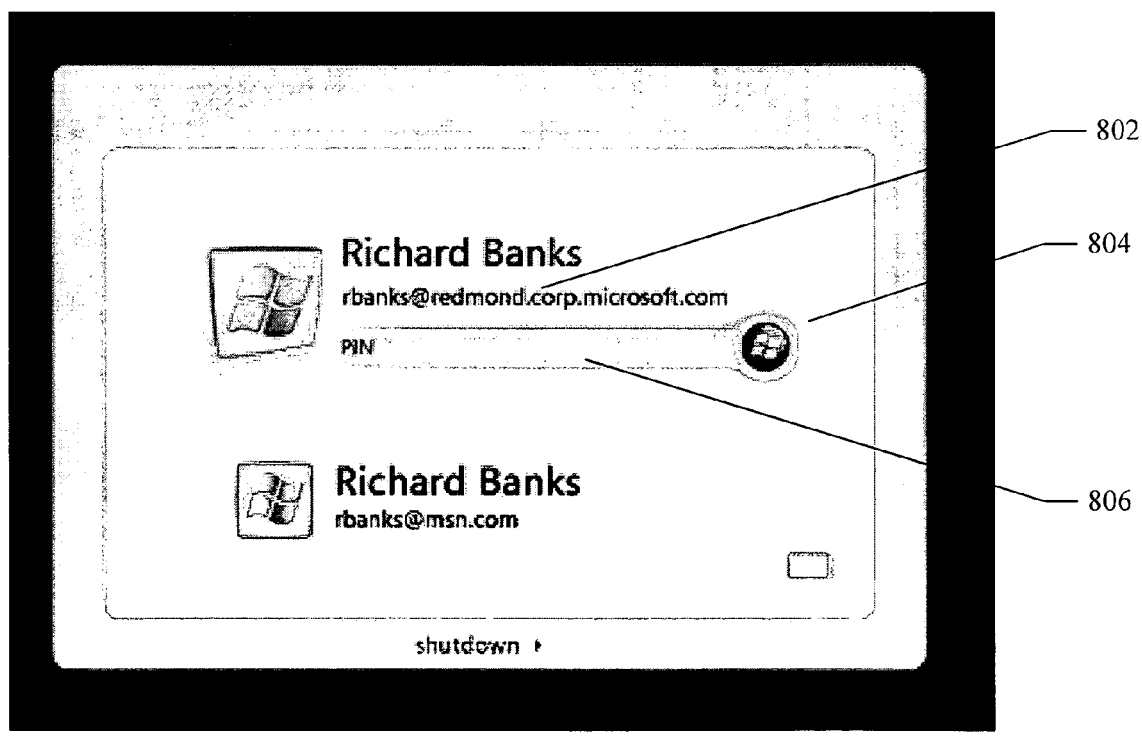
FIG. 8b is a logon screen showing two (2) accounts, the first of which is being prompted for the entry of a PIN to correspond as a credential with a certificate of a smart card being read by the local machine that is rendering the logon screen.

When the user's credentials from the smart card have been read, the list of logged on users from FIG. 7a disappears, and the logon screen 700b of FIG. 7b displays only an enumeration of the certificates that were on the user's smart card. This display is made by a cooperative processing that uses smart card reader 105 and its corresponding credential provider module 202, the credential provider API 204, and the logon UI 206. Since there is just one certificate on the smart card, the OS automatically selects the one certificate and displays the PIN field 704 as a prompt for data entry to the user. Referring now to FIG. 2, when the user types in the PIN in the PIN field 704, logon UI 206 passes the PIN to the OS logon 102 along with the certificate read from the smart card. The certificate read by smart card reader 105 and the PIN entered by the user can then be used to identify and authenticate the user with the LSA 106 in cooperation with the event driven credential provider module 202 that interfaces at credential provider API 204 with the OS of the local machine. If the user who inserted the smart card leaves the smart card in the reader 105 and hits the cancel button 706 on the screen 700b of FIG. 7b, the logon screen returns to its previous state and enumerates all three users as shown by screen 800a in FIG. 8a. If, however, the smart card includes more than more certificate, the OS will render a display that enumerates all of the certificates. As shown by screen 800b in FIG. 8b at reference numeral 804, once a user puts focus on one of the certificates 802, the OS renders a display that includes a PIN field 806. The user can then enter a PIN into the PIN field 806.

Figure 9A:
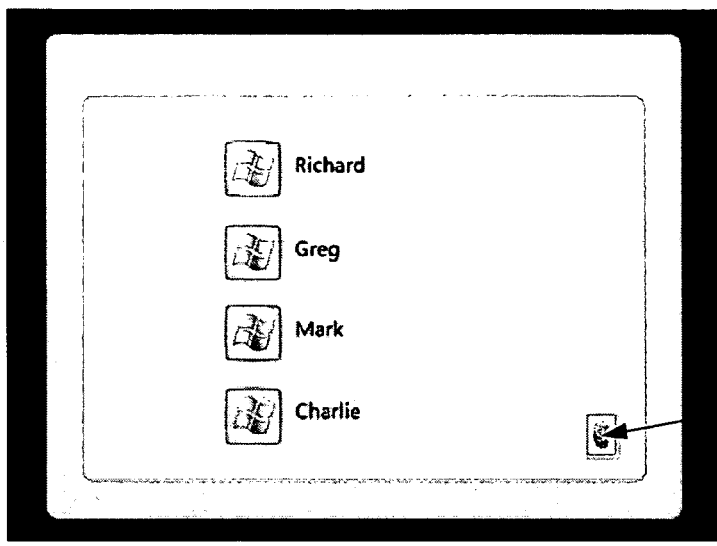
FIG. 9a is a logon screen showing four (4) accounts on a local machine that can authenticate a user using credentials read by a biometric reader.
Figure 9B:
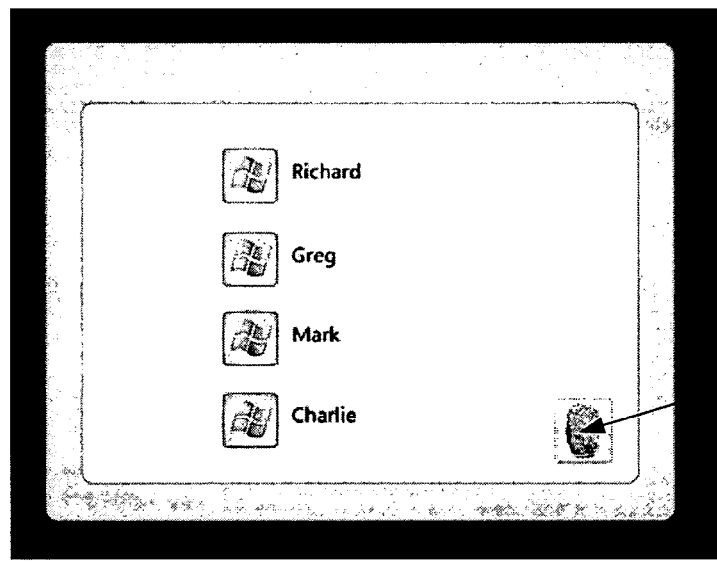
FIG. 9b is a logon screen showing four (4) accounts acknowledged on a local machine, where the logon screen is touch sensitive for the purpose of reading a fingerprint impression as a credential against which the local machine will authenticate a user using the credential in cooperation with a custom credential provider, where the credential including the fingerprint are translated by the credential provider into credentials that are compatible for authentication with the operating system of the local machine.
Figure 9C:
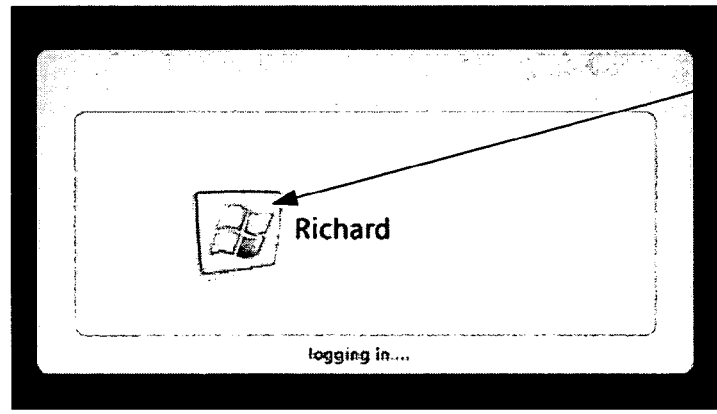
FIG. 9c is a logon screen showing one (1) account for which the corresponding user has been authenticated for use of the local machine by use of credential including the fingerprint of the user.

The event driven credential provider module 202 that corresponds to the smart card reader 105 is similar to a biometric event driven credential provider module 202 for finger print reader 103. An exemplary user logon experience in the case of a fingerprint credential is seen in FIGS. 9a-9c. As seen in FIG. 9a, a standalone local machine renders a screen that shows that four (4) accounts (e.g., four users have privileges to access the local machine). An icon 900a on the screen of FIG. 9a indicates that a fingerprint sensor is installed on the local machine. A user places his finger on a finger print sensor/scanner, such as on the peripheral finger print sensor/scanner 103 seen in FIG. 2. Alternatively, a touch sensitive screen, as shown in FIG. 9b, can have a fingerprint sensor icon 900b that is an optically scanning feedback mechanism. In either case, the finger print sensor/scanner sensor activates and then reads the fingerprint of the user's finger. The user gets feedback that the reading process has successfully identified and authenticated the user with the fingerprint as a credential for logging on to the local machine by the user's fingerprint using the event driven credential provider module 202 seen in FIG. 2. The credential provider module 202 compares the read of the user's fingerprint to its cache of stored fingerprints in credentials database 108b and finds a match to the user's fingerprint, where the user is 'Richard' as shown in FIG. 9c. The credential provider module 202 passes Richard's credentials to logon UI 206 via credential provider API 204. The logon UI 206 then passes Richard's credentials to OS logon 102 which logs Richard on to the local machine, the result of which is seen by Richard's user tile in the display of FIG. 9c at reference numeral 900c.

The foregoing FIGS. 2-9c were described for secure plug-in models in architecture for a logon process for credential provider modules. In reference to FIGS. 10-11, a logon process can include one or more custom Pre-Logon Access Provider (PLAP) modules 1102 that are interoperable with an OS of a local machine. Each PLAP module 1102 enables a user to select a logon connection type, such as by using a dial up modem to a favorite Internet Service Provider (ISP), by using a cable modem to establish a network connection, by using a VPN for a network connection, by a local area network connection, etc.

In some circumstances, a local machine may have been configured to log on when a Remote Access Service (RAS) session is started so that a network connection is established for the logon in order to authenticate users of the local machine against the network. For instance, a network administrator may require users to logon at a local machine for a RAS session because this requirement allows the network administrator to have tight controls over what is installed on the local machine before the local machine has a chance to establish a connection with an enterprise network that is administered by the network administrator. Such tight controls of the local machine may include updating the local machine with anti-virus or other applications to install, and may include forcing periodic changes to passwords, etc. In some cases, all local machines in an enterprise network may be required to establish a logon connection with a specific RAS session prior to logging on to the enterprise network.

Figure 10:
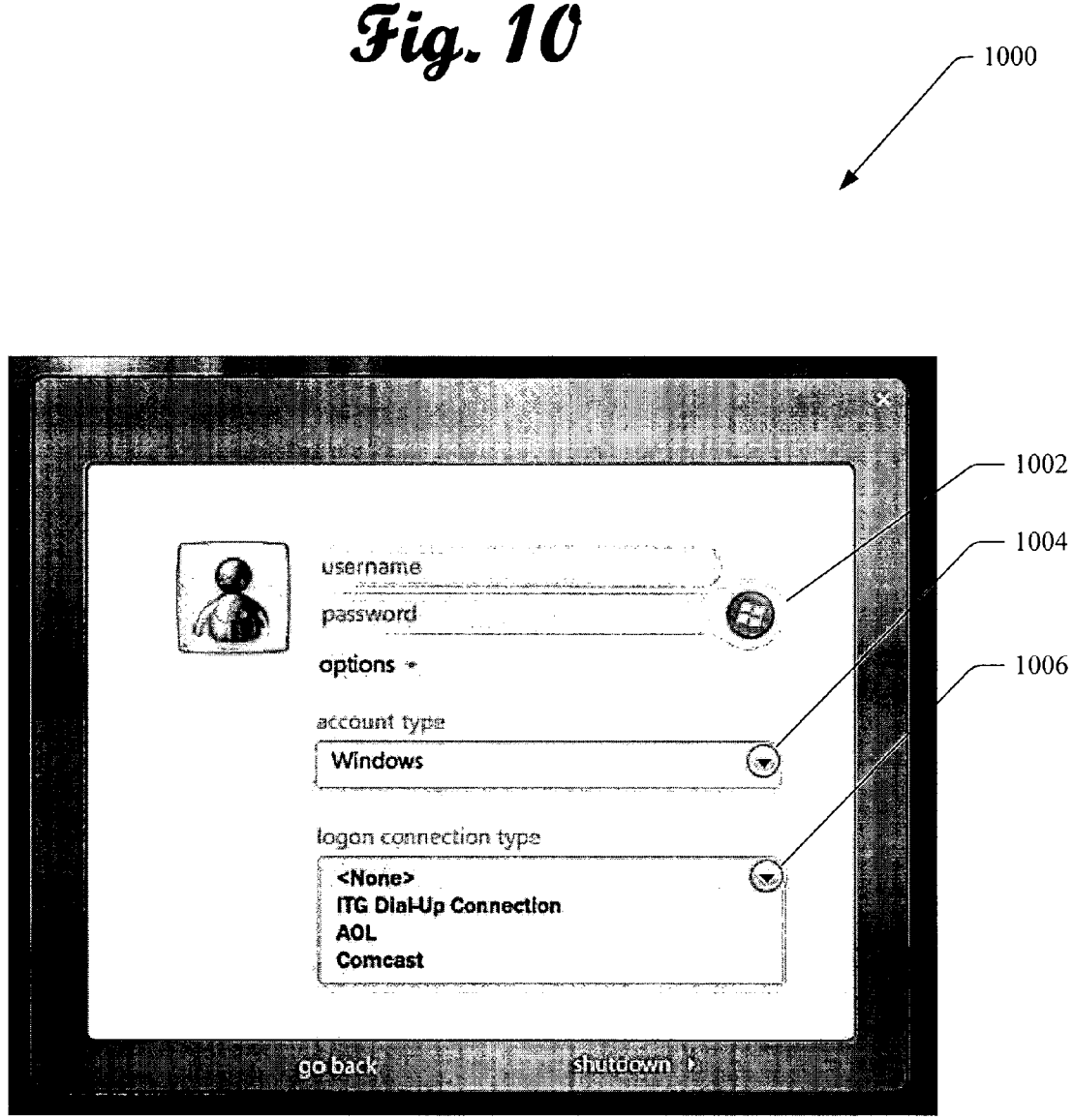
FIG. 10 is a logon screen from which a user can make a selection of one of a plurality of logon connection types and corresponding access services that will be used to establish a network connection session by use of credentials provided by input to the logon screen.

As shown in FIG. 10, a list of logon connection types is offered to a user upon activation of a pull down menu icon 1006. Each item on the list represents a separate logon provider or connection type through which a connection using a corresponding access service can be established to a network. As seen in FIG. 10, a selection of the connection type and corresponding access service from the list is required of the user, along with the input of a username and password into fields 1002 and an account type at field 1004. The list of logon connection types and corresponding access services is evoked by activation of icon 1006 so as to show all machine wide connections and allows the user to choose one from the list. Each connection represents a Remote Access Service (RAS) that is not necessarily provided by the provider of the OS, yet is compatible with the OS. For example, the RAS can be a custom dialer module provided by an independent software vendor unrelated to the provider of the OS. As such, the custom RAS obviates the need to use a default RAS dialer that is provided with the OS. The RAS session will use the credentials already entered at fields 1002-1004 when trying to establish a connection to a network that was specified by the user from the list at reference numeral 1006. If the credentials input by the user fail to establish the connection as was selected by the user, a prompt will be displayed that asks the user to provide additional credentials. Using these additional credentials, an attempt will again be made at making the connection via the user-specified logon connection type from the list at reference numeral 1006. If this next attempt is successful in establishing a connection to the network, then a return of new credentials will be made for use in the logon process described above with respect to FIGS. 2-9c.

Figure 11:
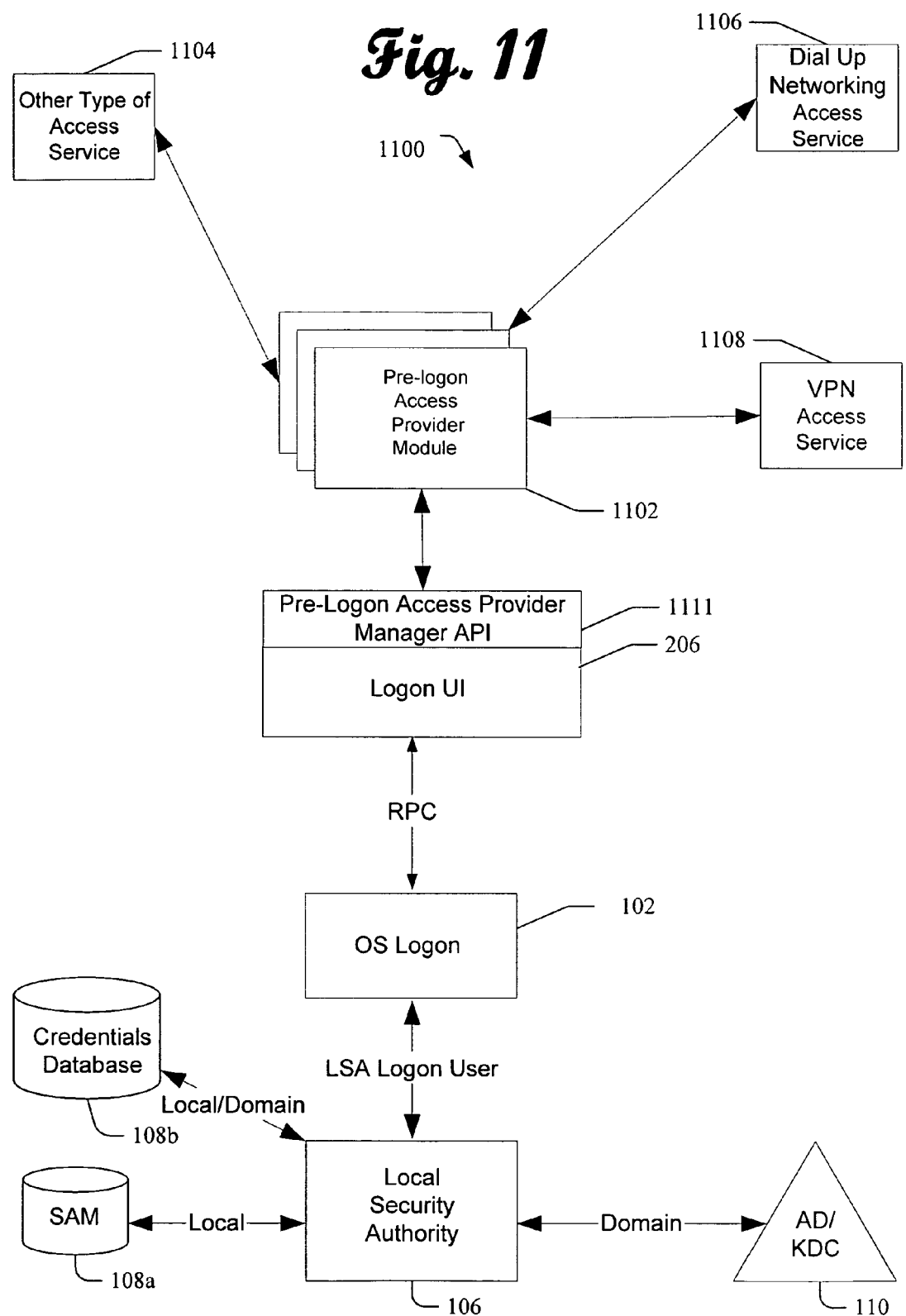
FIG. 11 is a flowchart of an exemplary implementation of a process for the use of a logon screen from which a user can make a selection of one of a plurality of logon connection types and corresponding access services that will be used to establish a network connection session by use of credentials provided by input to the logon screen.

The user interface seen in the screen 1000 of FIG. 10 can be further explained by reference to FIG. 11 that illustrates an exemplary process 1100 for establishing a type of connection to a user-specified access service. A logon UI 206, through a pre-logon access provider (PLAP) manager API 1112, requests that PLAP modules 1102 provide a flat list of a corresponding set of connection types and access services. The access services in the flat list correspond, for example, to a custom dial up access service 1106, a custom VPN access service 1108, and any other type of custom or default access service 1104. A representation of each access service 1104-1108 is displayed to the user by logon UI 206. Input from the user is made into fields 1002-1006 and includes a username, password, account type, and the user-specified connection type and corresponding access service from the list at reference numeral 1006. The PLAP manager API 1112 attempts to establish a connection to a domain using the access service selected by the user. If the connection is not successfully made, the PLAP manager API 1112 may cause the logon UI 206 to prompt the user for further information, such as additional credentials, before trying again to establish a connection to the user-selected access service.

Once the connection to a domain has been established by the PLAP manager API 1112 by use of the user-selected access service, the username and password input by the user are passed as credentials for authentication of the corresponding user, entity, or principal at the domain. A successful identification and authentication of the user, entity, or principal with the credentials will be communicated from the PLAP manager API 1112 to the logon UI 206. The logon UI 206 will perform an RPC to the OS logon 102, where the RPC will also communicate the credentials. The OS logon 102 passes the credentials as an LSA logon user call to the LSA 106 for local identification and authentication against a database of credentials at SAM 108a or at a local or remote credentials database 108b. Alternatively, the LSA 106 can pass the credentials over a domain connection to AD/KDC 110 for identification and authentication at the domain. Once the credentials have been used to identify and authenticate a user using either SAM 108*a*, credentials database 108*b*, or AD/KDC 110, the success thereof is communicated to OS logon 102 to complete the process of logging the user on to the local machine. In some implementations, the SAM 108*a*, the credentials database 108*b*, and the AD/KDC 110 can be at the same domain and may also be the same database. In other implementations, the authentication for a principal, entity, or user can be made with a corresponding credential against a token protocol credential service and/or a challenge and response protocol credential service.

Figure 12:
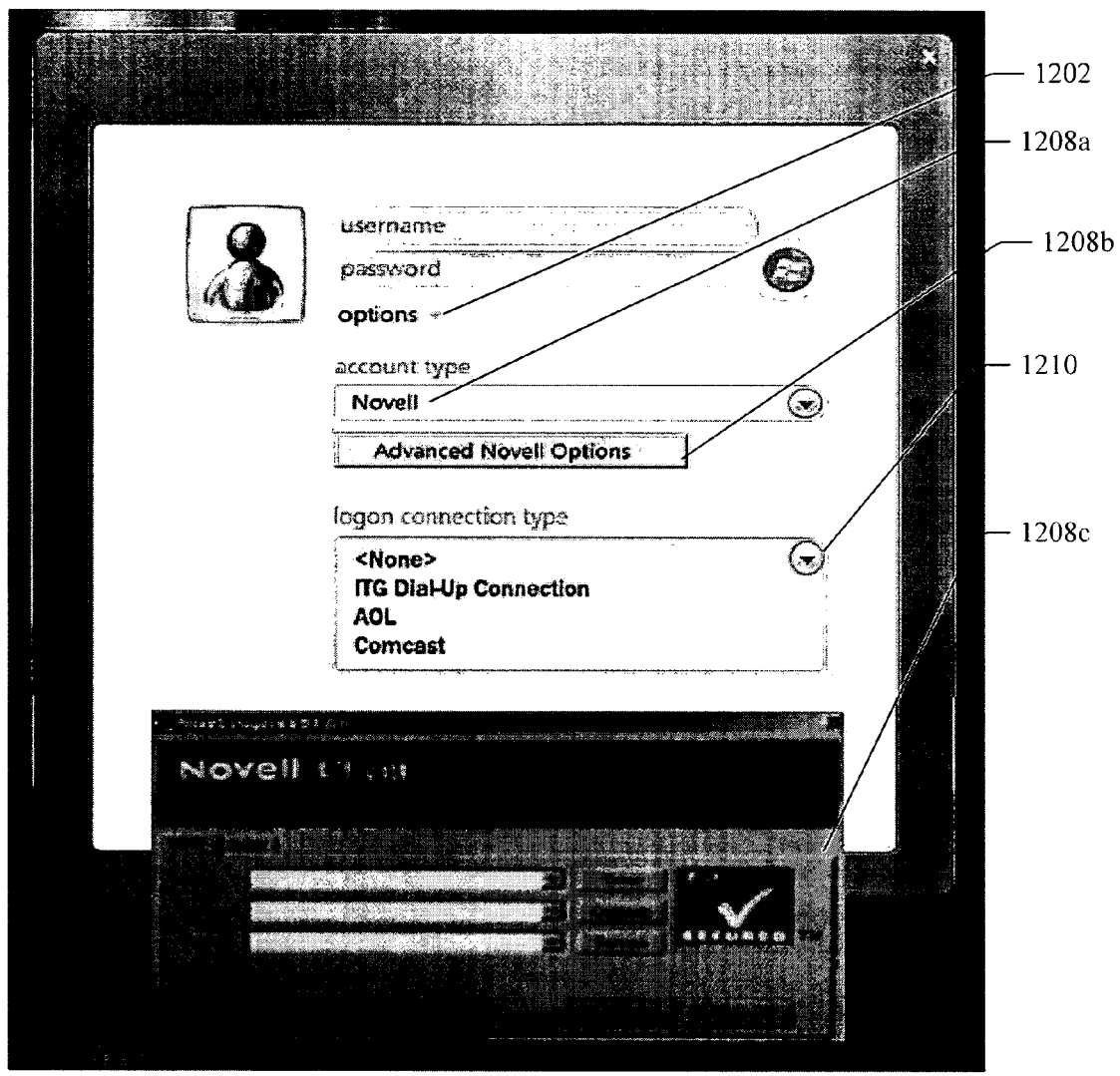
FIG. 12 is a logon screen for receiving credentials from a user and from which the user can make a selection of one of a plurality of logon connection types and corresponding access services, and can also make a selection of one of a plurality of credentials providers, where each of the user's selections can be used to identify and authenticate the user with the credentials so that the user can be logged in and use the local machine that renders the logon screen.
Figure 13:
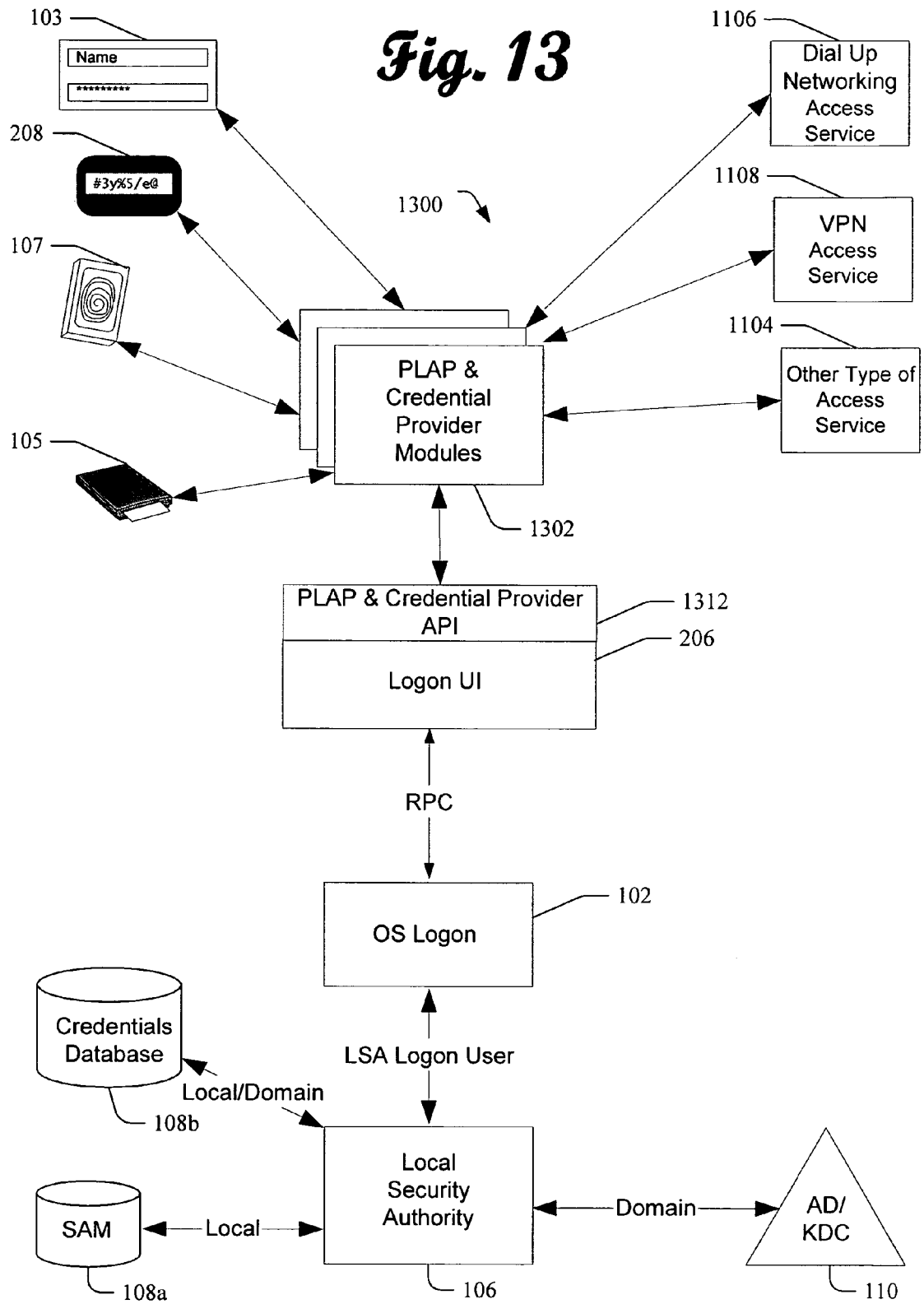
FIG. 13 is a flowchart of an exemplary implementation of a process for the use of a logon screen for receiving credentials from a user and from which the user can make a selection of one of a plurality of pre-logon access types and can also make a selection of one of a plurality of credentials providers, where each of the user's selections can be used to identify and authenticate the user with the credentials so that the user can be logged in through the selected access service to use the local machine that renders the logon screen.

The logon plug-in models for credential providers discussed above can be combined with the pre-logon access providers in variation implementations, examples of which will now be demonstrated in reference to FIGS. 12-13. FIG. 12 shows an example of a screen 1200 that allows a user to input a username and password and to select a logon options button 1202. The user's selection of the logon options button 1202 displays a flat list of accounts from which the user can make a selection of an account type 1208*a*. The account type 1208*a* selection represents the user's selection of a logon plug-in model for a specific credential provider. As seen in screen 1200, the user has selected the account type "Novell". The selection of the "Novell" account type allows the user to further select an "advanced Novell options" button 1208*b*. The selection of the "advanced Novell options" button 1208*b* brings up a Novell UI 1208*c* that prompts the user to input still further credentials. These further credentials will be used to identify and authenticate the user against an access database at a Novell server. The user can also see, and make a PLAP selection from, a flat list of access services by clicking on a pull down menu icon 1210.

A process 1300 shows a plurality of modules 1302 that include both PLAP modules and credential provider modules each having a respective API 1312 to a logon UI 206. Each PLAP module 1302 can correspond to any one of several default or custom pre-logon access providers. Each PLAP module 1302 can be selected by a user from the flat list of access services that are displayed by logon UI 206 after the user activates the pull down menu icon 1210. Each PLAP module 1302 can establish a connection to a respective network through a different type of connection and corresponding access service in order to authenticate a user using credentials against a local and/or remote credentials database. The flat list of access services is requested from the PLAP modules 1302 by the logon UI 206.

The user is prompted by the logon UI 206 to enter credentials at fields seen in FIG. 12, such as the username and password fields, as dictated by the user-selected default or custom credential provider modules 1302. Each credential provider modules 1302 may correspond to readers 103-107 and 208, as discussed above. These input credentials are processed by the corresponding credential provider module 1302 locally at the local machine. The credential provider module 1302 may be configured to do a translation on the input credentials, such as by translating biometric credentials received by fingerprint reader 103 or certificate credentials read by smart card reader 105. The translated credentials from credential provider module 1302 are in a credential protocol that is intended to be compatible for further identification and authentication by the OS of the local machine. As such, this translation of the original credentials to the translated credentials can be done locally at the local machine. Once this translation of the original credential into the translated credentials has been performed, the translated credentials are then provided by the credential provider module 1302 to the logon UI 206 through the API 1312. The API 1312 to the logon UI 206 uses the PLAP module 1302 selected by the user to establish connectivity to the access service using the corresponding type of connection. Stated otherwise, the PLAP module 1302 identifies the access service selected by the user from the flat list of access services that was displayed in the pull down menu of icon 1210 on the screen 1200.

The PLAP module 1302 receives the credentials that are compatible with the OS as were obtained from credential provider module 1302. The logon UI 206 then calls for the PLAP module 1302 to use the translated credentials from the credential provider module 1302 in order to establish a secure network connection session with the corresponding user-selected access service. The PLAP module 1302 then attempts to establish the network session with the user-selected access service to the domain at which a credentials database is located. If the PLAP module 1302 is unable to establish the network session using the user-selected access service, then the PLAP module 1302 can request the logon UI 206 to display a custom UI that prompts the user to enter still more credentials that are specific to the custom UI. For instance, the PLAP module 1302 may request credentials that are specific to authentication at a Novell server. These additional credentials may require still further input of a special username and special password that are needed in order to access a special web site on the Internet (e.g., Novell.com, AOL.com, MSN.com, etc.) in order to get a connection for a network session established with the user-selected access service. In this case, the custom UI for the PLAP module 1302 is displayed with a dialog box that prompts the user for still more credentials (e.g., Novell UI 1208*c*).

Once entered, the PLAP module 1302 then swaps or switches out the newly entered credentials from the Novell UI 1208*c* in place of the first credentials (username and password) that were previously acquired. These previous credentials are removed and the newly entered credentials are used. The newly entered credentials are returned back to logon UI 206. The logon UI 206 then gives the newly entered credentials to the OS logon 102 via an RPC call. The OS logon 102 then passes the newly entered credentials to the LSA 106. The newly entered credentials are tested in the LSA 106 for identification and authentication. The LSA 106 validates against a local database using SAM 108*a* and/or local or remote credentials database 108*b*. In an active directory domain case, the validation of the newly entered credentials is made by passing the new entered credentials over the network session to the domain at the AD/KDC 110, where the network session connection was established by the PLAP module 1302. Accordingly, the identification and authentication process using the credential provider and PLAP modules 1302 can be a loop back routine.

By way of further example, a user may originally enter a username of "Bill" and a password of "101" as a first set of credentials which are processed locally at the local machine. A PLAP module 1302, which corresponds to a user-selected access service, then calls through API 1312 for the logon UI 206 to prompt the user to enter another password. The user then enters the password of "102". The new password of "102" is sent over a connection to a credential database (e.g., SAM 108*a*, credentials database 108*b*, AD/KDC 110, etc.) using the user-selected access service in a network session connection. After successful authentication against the credential database, the password of "102" is then communicated from logon UI 206 through OS logon 102 to LSA 106. LSA 106 passes the password of "102" to a domain for identification and authentication against the AD/KDC 110 or another credential database. So, the first performance is that of the PLAP module 1302 and the second performance is that of the credential provider module 1302.

Each PLAP module 1302 involves itself in a secure identification and authentication routine as well as in the establishment of a network connection session to a domain. In addition to this, the user-selected access service that is established by a respective default or custom PLAP module 1302 can also be the network connection session that is used by the credential provider module 1302 for further identification and authentication of credentials.

A local authentication of credentials can be a different style of authentication of credential at a domain. The style can be qualified by data kept in a user account in the active directory at the domain for AD/KDC 110. The active directory for a user account can have different attributes, such as one attribute that specifies if the user account can establish a RAS session, and another attribute that specifies whether the user account is permitted to log on interactively. By way of example, these attributes can be stored as two (2) different bits in the user account of the active directory at the domain, and can be queried as such.

Other implementations can combine the use of both a credential provider and a PLAP, such as where a local machine accesses the Internet whenever a user logs on. In this case, at start up of the local machine, a start up routine is set to automatically execute. This startup routine automatically uses the user's logon credentials to logon to the local machine as well as to logon to an Internet Service Provider (ISP) in order to automatically access and retrieve information from a default Web site. Alternatively, the user may be prompted to enter two (2) sets of credentials—one set for the local machine and different set for the ISP that will be accessed through a user-specified PLAP.

In yet another implementation, a local machine may be configured so as require identification and authentication of all users at a Novell (or other type) server at a specific domain. In this case, the user of the local machine will be prompted to enter server-specific credentials (e.g., Novell-server type credentials). The user then will select the advanced Novell option 1208*b* seen in FIG. 12. The logon UI 206 seen in FIG. 13 gathers credentials input by the user in order to satisfy modules 1302 for both the access service and for the credential provider corresponding to the Novell server. During this gathering of credentials, a connection over a network to the domain of the Novell server has not yet been made. The user can also select a custom PLAP dialer from the list of access services associated with icon 1210. The user can then indicate that all input has been made (e.g., the user presses the 'enter' key). At this point, for instance, network traffic can begin from the local machine to a remote credential database at a domain and to the domain of the AD/KDC 110. The network traffic uses the network connection session established by the PLAP module 1302 to a corresponding access service. The network traffic can include credentials in metadata that could have been simultaneously gathered and then sequentially communicated—first for the authentication for a principal to use an access service established using a PLAP module 1302 and second for the credential provider authentication with a credential provider module 1302. As such, the access service allows the local machine to securely communicate with the active directory at its domain, which may be a third party Internet server.

Exemplary Computing System and Environment.

FIG. 14 shows an exemplary computer system and environment that can be used to implement the processes described herein. A computer 1442, which can be a local machine as described with respect to FIGS. 2*a*-13, includes one or more processors or processing units 1444, a system memory 1446, and a bus 1448 that couples various system components including the system memory 1446 to processors 1444. The bus 1448 represents one or more of any of several types of bus structures, including a memory bus or memory controller, a peripheral bus, an accelerated graphics port, and a processor or local bus using any of a variety of bus architectures. The system memory 1446 includes read only memory (ROM) 1450 and random access memory (RAM) 1452. A basic input/output system (BIOS) 1454, containing the basic routines that help to transfer information between elements within computer 1442, such as during start-up, is stored in ROM 1450.

Computer 1442 further includes a hard disk drive 1456 for reading from and writing to a hard disk (not shown), a magnetic disk drive 1458 for reading from and writing to a removable magnetic disk 1460, and an optical disk drive 1462 for reading from or writing to a removable optical disk 1464 such as a CD ROM or other optical media. The hard disk drive 1456, magnetic disk drive 1458, and optical disk drive 1462 are connected to the bus 1448 by an SCSI interface 1466 or some other appropriate interface. The drives and their associated computer-readable media provide nonvolatile storage of computer-readable instructions, data structures, program modules and other data for computer 1442. Although the exemplary environment described herein employs a hard disk, a removable magnetic disk 1460 and a removable optical disk 1464, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 1456, magnetic disk 1460, optical disk 1464, ROM 1450, or RAM 1452, including an OS 1470, one or more modules or application programs 1472. By way of example, and not by way of limitation, the one or more modules or application programs 1472 can be the credential provider modules 202, the sub-authentication credential provider 302, the PLAP modules 1102, and other modules 1302. Other items that may be stored on the hard disk 1456, magnetic disk 1460, optical disk 1464, ROM 1450, or RAM 1452 including other program modules 1474 and program data 1476. A user may enter commands and information into computer 1442 through input devices such as a keyboard 1478 and a pointing device 1480. Other input devices (not shown in FIG. 14) may include finger print reader 103, token reader 208, smart card reader 105, a microphone, a joystick, a game pad, a satellite dish, a camera or optical scanner, a scent detection and analysis device, or the like. These and other input devices are connected to the processing unit 1444 through an interface 1482 that is coupled to the bus 1448. A monitor 1484 or other type of display device is also connected to the bus 1448 via an interface, such as a video adapter 1486. In addition to the monitor, personal computers typically include other peripheral output devices (not shown) such as speakers and printers.

Computer 1442 commonly operates in a networked environment using logical connections to one or more remote computers, such as a remote computer 1488. The remote computer 1488 may be another personal computer, a server, a router, a network PC, a peer device or other common network node, and typically includes many or all of the elements described above relative to computer 1442. The logical connections depicted in FIG. 14 include a local area network (LAN) 1490 and a wide area network (WAN) 1492. Such networking environments are commonplace in offices, enterprise-wide computer networks, intranets, and the Internet.

When used in a LAN networking environment, computer 1442 is connected to the local network through a network interface or adapter 1494. When used in a WAN networking environment, computer 1442 typically includes a modem 1496 or other means for establishing communications over the wide area network 1492, such as the Internet. The modem 1496, which may be internal or external, is connected to the bus 1448 via a serial port interface 1468. In a networked environment, program modules depicted relative to the personal computer 1442, or portions thereof, may be stored in the remote memory storage device. It will be appreciated that the network connections shown are exemplary and other means of establishing a communications link between the computers may be used.

Generally, the data processors of computer 1442 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the blocks described below in conjunction with a microprocessor or other data processor. The invention also includes the computer itself when programmed according to the methods and techniques described herein.

For purposes of illustration, programs and other executable program components such as the OS are illustrated herein as discrete blocks, although it is recognized that such programs and components reside at various times in different storage components of the computer, and are executed by the data processor(s) of the computer.

Conclusion

Implementations allow for a plurality of coexisting interoperable modules to be used that are fully compatible with an OS of a local machine. These coexisting interoperable modules can be log-on plug-in models for credential providers to logon to the local machine via its OS, where the models include but are not limited to digital certificates, biometrics, username and password credentials, etc. These coexisting interoperable modules can also be pre-logon access providers, including but not limited to Internet tunneling applications, wireless communication applications, Ethernet VPN applications, twisted pair circuit switched network applications using dialup 56 K modem hardware, etc.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method executed on a single local machine having a processor executing computer-executable instructions stored in a memory, the method comprising:

initializing, by a native operating system (OS) on the local machine, a logon user interface (UI);

initializing, with the logon UI on the single local machine, a plurality of different coexisting credential provider modules, each for translating respectively different types of credentials into a common credential protocol, the common credential protocol being compatible with the native OS of the local machine, each said credential provider module logging a user on with the native OS on the local machine via the logon UI to access the local machine using one of a plurality of corresponding different input devices in communication with the local machine;

receiving a first said credential from the user at a first one of said input devices in communication with the local machine;

translating the first credential with a first one of said credential provider modules corresponding to the first input device that is in communication with the local machine;

communicating the translated first credential having the common credential protocol through a credential provider Application Program Interface (API) to the logon UI of the native OS, wherein the credential provider API is configured to interface with each of the plurality of different coexisting credential provider modules;

passing the translated first credential having the common credential protocol to an OS logon module of the native OS from the logon UI;

calling the OS logon module for the native OS to authenticate the translated credential having the common credential protocol against a credential database; and logging the user on with the native OS to access the local machine when the authentication is successful.

2. The method as defined in claim 1, wherein the logging on of the user further comprises logging the user on to the local machine after one or more additional said credentials have been received, translated by a respective said different coexisting credential provider module, and authenticated successfully, in addition to said first credential.

3. The method as defined in claim 1, wherein the user is not logged on to the local machine at the time when the translated credentials are authenticated.

4. The method as defined in claim 1, wherein the use of the OS logon module of the native OS to authenticate the translated first credential having the common credential protocol against the credential database further comprises:

communicating the translated credential to an LSA; and determining the authentication with the LSA against the credential database that is selected from the group consisting of:

a SAM database;

a local database other than the SAM database;

a remote credential database;

a token protocol credential service;

a challenge and response protocol service; and an AD and KDC at a domain remote from the local machine.

5. The method as defined in claim 1, further comprising:

initializing one or more pre-logon access provider (PLAP) modules at the local machine coexisting with said credential provider modules, each PLAP module operating with the OS of the local machine, so that the user selects a logon connection type out of a plurality of available logon connection types for establishing a network connection; and establishing, by a selected one of said one or more PLAP modules, a network connection from the local machine to a domain using the translated first credential.

6. A computer-readable medium comprising instructions that, when executed by a computer, perform the method of claim 1.

7. A method executed on a single local machine having a processor executing computer-executable instructions stored in a memory. the method comprising:
- initializing, by a native operating system (OS) on the local machine, a logon user interface (UI);
- initializing, with the logon UI on the single local machine, a plurality of different coexisting credential provider modules, each said credential provider module configured to perform a translation of a respectively different type of credential received at a different type of input device in communication with the local machine for translating the respectively different types of credentials into a common credential protocol, the common credential protocol being compatible with the native OS of the local machine, wherein each said credential provider module logs a user on with the native OS on the local machine via the logon UI to access the local machine using one of a plurality of corresponding different input devices communication with the local machine;
- receiving a first credential from the user at a first one of said input devices in communication with the local machine;
- translating the first credential with a first one of said credential provider modules that corresponds to the first input device;
- communicating the translated first credential having the common credential protocol through a credential provider interface to the logon UI of the native OS, wherein the credential provider interface is configured to interface with each of the plurality of coexisting different said credential provider modules;
- passing the translated first credential having the common credential protocol to a logon routine of the native OS from the logon UI;
- authenticating the translated first credential against a credential database with the logon routine of the native OS; and
- logging the user on to access the local machine with the native OS when the authentication is successful.

8. The method as defined in claim 7, wherein the logging on of the user to access the local machine with the native OS further comprises deferring the logging on of the user to access the local machined until the receiving, the translating, the communicating, the passing, and the authenticating successfully have been repeated for at least one more additional said credentials in addition to said first credential.

9. The method as defined in claim 7, wherein the user is not logged on to access the local machine until after the translated first credential is authenticated against the credential database with the logon routine of the native OS.

10. The method as defined in claim 7, wherein the authenticating of the translated first credential against the credential database with the logon routine of the native OS further comprises:
- communicating the translated credential to an LSA from the logon routine of the native OS; and
- determining the authentication with the LSA against the credential database that is selected from the group consisting of:
- a SAM database;
- a local database other than the SAM database;
- a remote credential database;
- a token protocol credential service;
- a challenge and response protocol service; and
- an AD and KDC at a domain remote from the local machine.

11. A computer-readable medium comprising instructions that, when executed by a computer, perform the method of claim 7.

12. A computer-readable medium comprising a plurality of different coexisting credential provider modules initialized with a logon user interface (UI) by a native operating system (OS) on a single local machine, each including instructions that, when executed by the local machine, receive and translate a credential into a common credential protocol so as to be compatible for authentication by an authentication component of the native OS against a credential database for logging a user identified by the credential on with the native OS to access the local machine when the authentication is successful, wherein:
- the translated credential is received via a credential provider Application Programming Interface (API) of the authentication component of the native OS;
- the credential provider API of the authentication component of the native OS is compatible for receiving each of a plurality of said credentials from a corresponding plurality of different coexisting credential provider modules; and
- each said different coexisting credential provider module is configured to:
- receive a respective different type of said credential from a respective input device, each respective input device coupling to the local machine, wherein the user selects one or more of the input devices for logging on with the native OS to access the local machine; and
- translate each said different type of said credential into the credential protocol so as to be compatible for authentication by the authentication component of the native OS against the credential database.

13. The computer-readable medium as defined in claim 12, wherein the authentication component of the native OS comprises:
- the logon UI;
- an OS logon module for receiving Remote Procedure Call (RPC) calls from the logon UI module; and
- an LSA for determining the authentication, and in communication with, the credential database that is selected from the group consisting of:
- a SAM database;
- a local database other than the SAM database;
- a remote credential database;
- a token protocol credential service;
- a challenge and response protocol service; and
- an AD and KDC at a domain remote from the local machine.

14. A method executed on a single local machine having a processor executing computer-executable instructions stored in a memory, the method comprising:
- initializing, by a native operating system (OS) on the local machine, a logon user interface (UI);
- initializing, with the logon UI on the single local machine, a plurality of different coexisting credential provider modules, each said credential provider module performing a translation of a respectively different type of credential received at one of a plurality of different types of input devices in communication with the local machine for translating the respectively different types of credentials into a common credential protocol, the common credential protocol being compatible with the native OS of the local machine, wherein each said credential provider module logs a user on with the native OS on the local machine via the logon UI to access the local machine using one of the plurality of corresponding different input devices in communication with the local machine;

receiving a first credential from the user at a first said input device in communication with the local machine;

receiving a second credential from the user at a second said input device in communication with the local machine;

translating the first credential into the common credential protocol using a first one of the credential provider modules corresponding to the first input device that is in communication with the local machine;

translating the second credential into the common credential protocol using a second one of the credential provider modules corresponding to the second input device that is in communication with the local machine;

using a component of the OS to authenticate the translated first credential and second credential having the common credential protocol against a credential database; and logging the user on with the OS to access the local machine when the authentication of both the first credential and the second credential is successful.

15. A method executed on a single local machine having a processor executing computer-executable instructions stored in a memory. the method comprising:

initializing, by a native operating system (OS) on the local machine, a logon user interface (UI);

initializing with the logon UI on the single local machine a plurality of different coexisting credential provider modules, each for translating respectively different types of credentials into a common credential protocol, the common credential protocol being compatible with the native OS of the local machine, each said credential provider module logging a user on with the native OS on the local machine via the logon UI to access the local machine using one of a plurality of corresponding different input devices in communication with the local machine;

initializing one or more pre-logon access provider (PLAP) modules at the local machine coexisting with said credential provider modules, each PLAP module operating with the OS of the local machine so that the user selects a logon connection type out of a plurality of logon connection types for establishing a network connection;

receiving a first said credential from the user at a first one of said input devices in communication with the local machine;

translating the first credential with a first one of said credential provider modules corresponding to the first input device that is in communication with the local machine;

establishing, by a selected one of said PLAP modules, a network connection from the local machine to a domain using the translated first credential;

communicating the translated first credential having the common credential protocol through a credential provider interface to the logon UI of the native OS, wherein the credential provider interface is configured to interface with each of the plurality of coexisting different said credential provider modules;

passing the translated first credential having the common credential protocol to a logon routine of the native OS from the logon UI;

authenticating the translated first credential against a credential database with the logon routine of the native OS; and logging the user on to access the local machine with the native OS when the authentication is successful.

16. A method executed on a single local machine having a processor executing computer-executable instructions stored in a memory, the method comprising:

initializing, by a native operating system (OS) on a local machine, a logon user interface (UI);

initializing, with the logon UI on the single local machine, a plurality of different coexisting credential provider modules, each said credential provider module configured to perform a translation of a respectively different type of credential received at a different type of input device in communication with the local machine for translating the respectively different types of credentials into a common credential protocol, the common credential protocol being compatible with the native OS of the local machine, wherein each said credential provider module logs a user on with the native OS on the local machine via the logon UI to access the local machine using one of a plurality of available corresponding different input devices in communication with the local machine;

choosing, by a user, one or more of said plurality of different types of input devices for logging on from among the plurality of available different input devices;

receiving a first credential from the user via a chosen first one of said input devices in communication with the local machine;

translating the first credential into the common credential protocol compatible with the native OS of the local machine with a first one of said credential provider modules that corresponds to the chosen first input device;

communicating the translated first credential having the common credential protocol through a credential provider interface to the logon UI of the native OS, wherein the credential provider interface is configured to interface with each of the plurality of coexisting different said credential provider modules;

passing the translated first credential having the common credential protocol to a logon routine of the native OS from the logon UI;

authenticating the translated first credential against a credential database with the logon routine of the native OS; and logging the user on to access the local machine with the native OS when the authentication is successful.

* * * * *